United States Patent [19]
White et al.

[11] Patent Number: 5,764,938
[45] Date of Patent: Jun. 9, 1998

[54] RESYNCHRONIZATION OF A SUPERSCALAR PROCESSOR

[75] Inventors: Scott A. White; Michael D. Goddard, both of Austin, Tex.

[73] Assignee: Advanced Micro Devices, Inc., Sunnyvale, Calif.

[21] Appl. No.: 797,434

[22] Filed: Feb. 10, 1997

Related U.S. Application Data

[63] Continuation of Ser. No. 252,308, Jun. 1, 1994, Pat. No. 5,649,225.

[51] Int. Cl.⁶ .................................................. G06F 9/30
[52] U.S. Cl. .................................................. 395/376
[58] Field of Search ................................. 395/382, 391, 395/392, 580, 582, 581, 586, 376

[56] References Cited

U.S. PATENT DOCUMENTS

| | | | |
|---|---|---|---|
| 5,367,703 | 11/1994 | Levitan | 395/800 |
| 5,434,985 | 7/1995 | Emma et al. | 395/375 |
| 5,606,676 | 2/1997 | Grochowski | 395/586 |
| 5,651,125 | 7/1997 | Witt et al. | 395/394 |

*Primary Examiner*—David Y. Eng
*Attorney, Agent, or Firm*—Skjerven, Morrill, MacPherson, Franklin & Friel LLP; Ken J. Koestner

[57] ABSTRACT

Operations of a pipeline processor (110) are resynchronized under designated conditions. The processor updates a fetch program counter (210) and, as directed by the counter, fetches instructions from a memory (114). The processor concurrently dispatches, in the fetched order, multiple instructions to designated functional units (170, 171, 172, 173, 174 and 175). Dispatched instructions are queued in functional unit reservation stations. Result entries corresponding to the queued instructions are allocated in a reorder buffer 126 queue in their order of dispatch. Instructions are executed out of their fetched order and results are entered in the allocated result entries when execution is complete. Allocated result entries at the head of the reorder buffer queue are retired and an instruction pointer (620) is updated. The processor is resynchronized when it detects a resynchronization condition and acknowledges the resynchronization condition in the allocated result entry corresponding to the instruction that detected the condition. When the reorder buffer entry holding the resynchronization acknowledgement is retired, the processor flushes the reorder buffer and the reservation stations of the functional units and redirects the fetch program counter to the instruction addressed by the instruction pointer.

19 Claims, 23 Drawing Sheets

FIG. 1A

KEY TO FIG. 1

| FIG. 1A |
| FIG. 1B |

FIG. 1

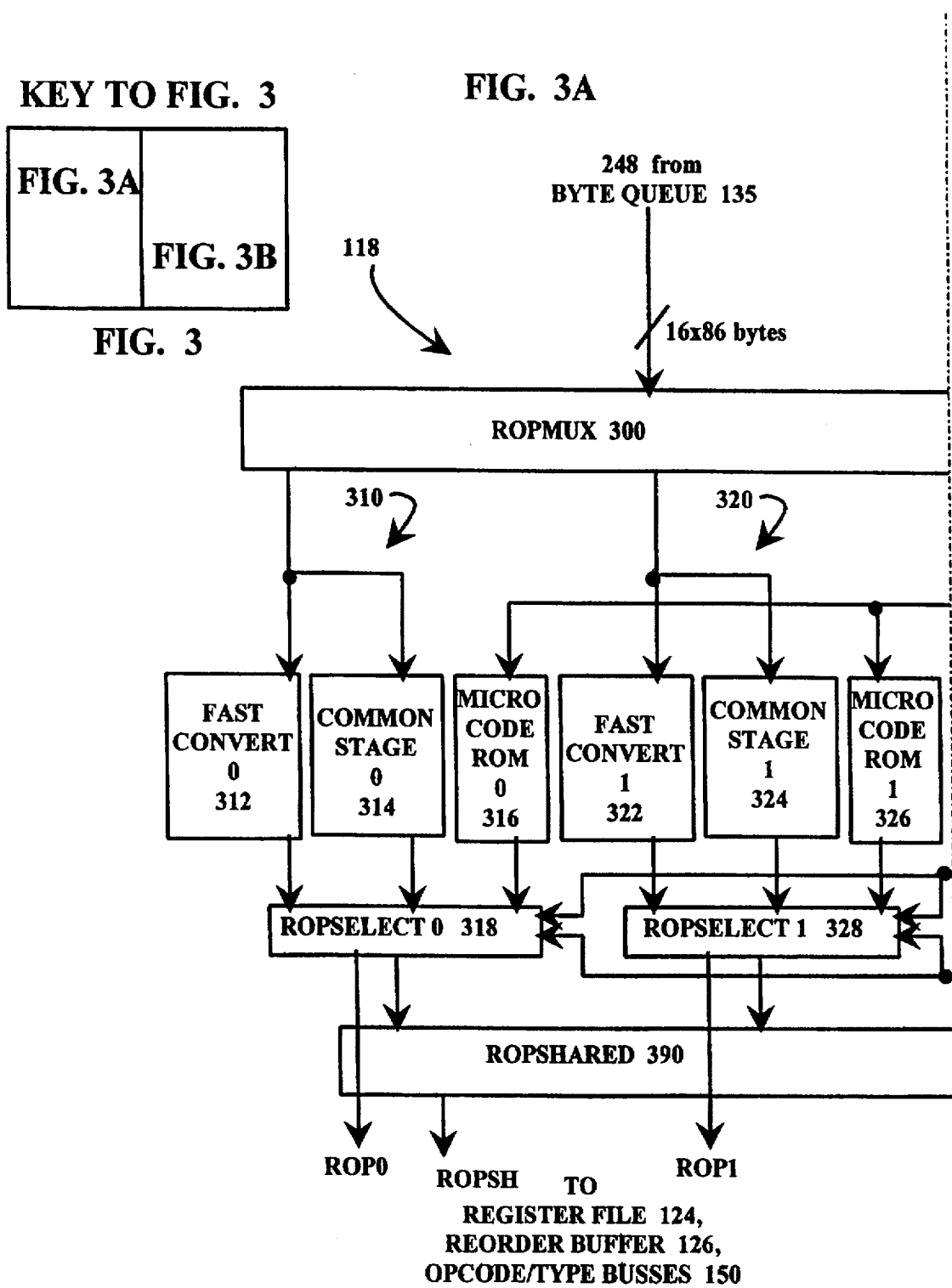

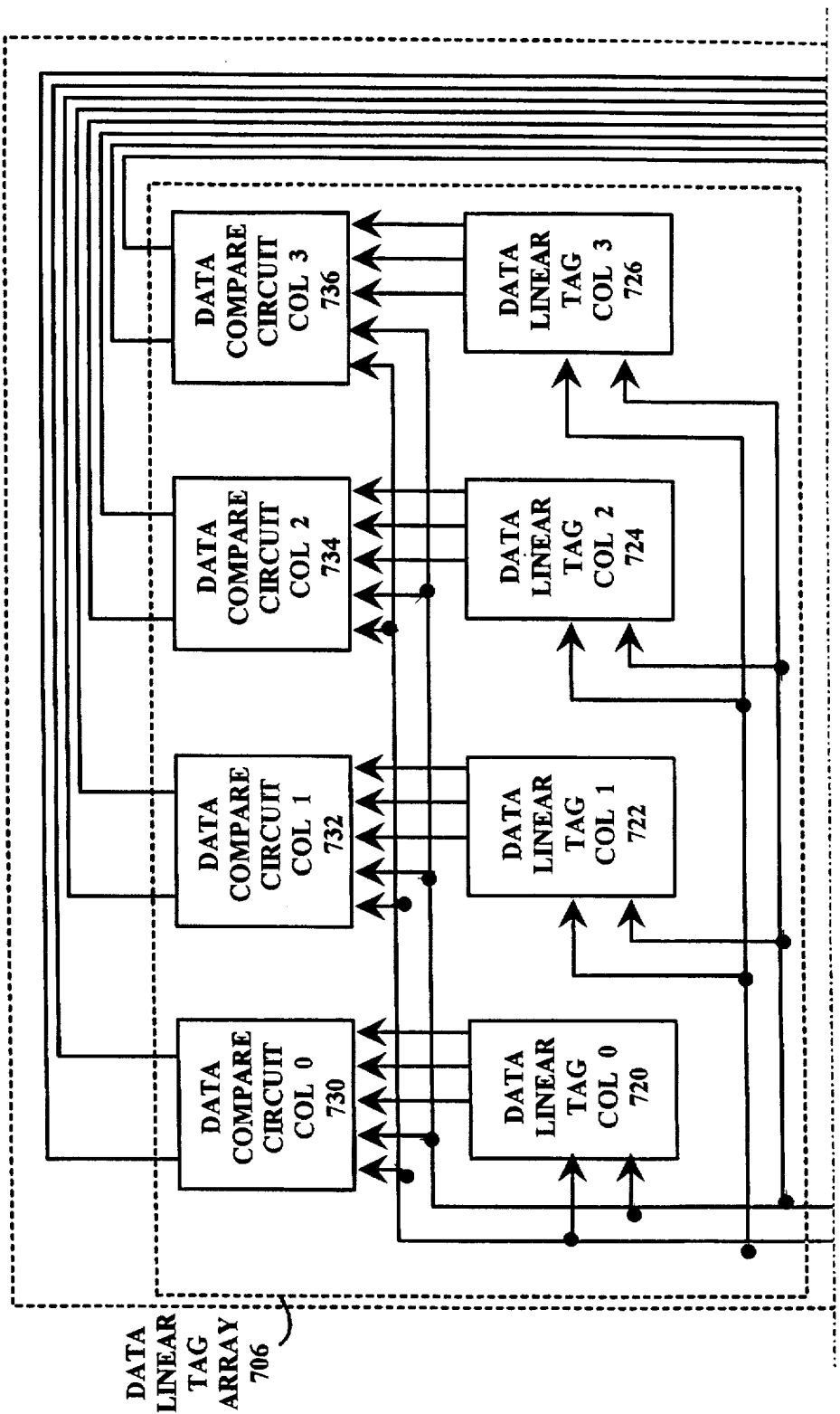

KEY TO FIG. 17

| FIG. 17A | FIG. 17B |

RESYNCHRONIZATION OF A SUPERSCALAR PROCESSOR

CROSS-REFERENCE TO RELATED APPLICATION

This application is a continuation of application Ser. No. 08/252,308 filed on Jun. 1, 1994, now U.S. Pat. No. 5,649,225.

BACKGROUND OF THE INVENTION

1. Field of the Invention

The present invention relates to a processor architecture, and more particularly to a processor architecture for resynchronizing operations following certain conditions.

2. Description of the Related Art

Processors and computers generally handle instructions in several steps, usually including steps of fetching, decoding and executing instructions. Early technology processors performed these steps serially. Advances in technology have led to pipelined-architecture processors, also called scalar processors, which perform different steps of many instructions concurrently. A "superscalar" processor is implemented using a pipelined structure, but improves performance by concurrently handling several scalar instructions in each processing step. Accordingly, several instructions are processed at one time in the superscalar processor pipeline.

In a superscalar processor, instruction conflicts and dependency conditions arise in which a dispatched instruction cannot be executed because data or resources are not available. For example, a dispatched instruction cannot execute when its operands are dependent upon data calculated by other nonexecuted instructions. Thus, performance of a superscalar processor is further improved when multiple concurrently-executing instructions are allowed to access a common register. However, this inherently creates a resource conflict. One technique for resolving register conflicts is called "register renaming". Multiple temporary renaming registers are dynamically allocated, one for each instruction that sets a value for a permanent register. In this manner, one permanent register may serve as a destination for receiving the results of multiple instructions. These results are temporarily held in the multiple allocated temporary renaming registers. The processor keeps track of the renaming registers so that an instruction that receives data from a renaming register accesses the appropriate register. This register renaming function may be implemented using a reorder buffer which contains temporary renaming registers.

Superscalar processor performance is further improved by the speculative execution of branching instructions, in which conditions of branching are predicted and instructions are processed based on those predictions so that instructions are continually decoded without waiting for verification of the predictions. Decoupling of instruction decoding and instruction execution employs a buffer between the processor's instruction decoder and functional units that execute instructions.

Thus, in addition to the several instructions that are processed at one time in the superscalar processor pipeline, additional instructions in a speculative state are held in the processor buffer.

Occasionally a condition arises in which it is desirable to terminate instructions in the pipeline and discard results of speculative instructions but to retain results of instructions that are no longer speculative.

What is desired is a processor and method of operating a processor that clears the superscalar pipeline and the speculative state of the processor and restarts instruction processing at the most recent nonspeculative instruction. The nonspeculative state of the processor must be precisely retained.

SUMMARY OF THE INVENTION

In accordance with a first embodiment, there is described a method of operating a pipeline processor including the steps of determining an ordered sequence of instruction fetching, fetching the instructions in the determined order, queuing the fetched instructions in the determined order and speculatively executing the instructions to generate results when processor resources and data are ready and available for instruction execution. This order of speculatively executing the instructions is called an out-of-order execution of instructions. The method further includes the steps of retiring executed instruction results in the order of fetching, tracking the retiring of executed instruction results using an instruction pointer. The method further includes resynchronizing the processor, including the steps of detecting a resynchronization condition as an instruction is executed, resynchronizing the processor on retiring of the result of an instruction for which a resynchronization condition is detected. The resynchronization operation includes the steps of flushing the queue of fetched instructions and redirecting the sequence of instruction fetching based on the tracking of retired instruction results.

In accordance with a second embodiment, there is described a pipeline processor including a fetch program counter for determining an in-order sequence of instruction fetching, an instruction cache connected to the fetch program counter for fetching the instructions in-order, a reorder buffer array connected to the instruction cache for queuing the fetched instructions in-order, a functional unit connected to the instruction cache and connected to the reorder buffer array for speculatively executing the instructions out-of-order to generate results. The processor further includes a reorder buffer controller connected to the functional unit for retiring executed instruction results in-order, an instruction pointer connected to the reorder buffer controller for tracking the retiring of executed instruction results and a resynchronization condition detector connected to the functional unit for detecting a resynchronization condition as an instruction is executed. The processor also includes a resynchronization controller connected to the reorder buffer controller, which is responsive to the retiring of the result of an instruction for which a resynchronization condition is detected. The resynchronization controller further includes a queue controller connected to the resynchronization controller for flushing the queue of fetched instructions and a branch unit connecting the instruction pointer to the fetch program counter for redirecting the in-order sequence of instruction fetching based on the tracking of retired instruction results.

BRIEF DESCRIPTION OF THE DRAWINGS

The present invention may be better understood and its advantages, objects and features made better apparent by making reference to the following description, taken in conjunction with the accompanying drawings, in which like reference numbers identify like elements, and wherein.

DETAILED DESCRIPTION OF THE PREFERRED EMBODIMENT

Figure 1B:
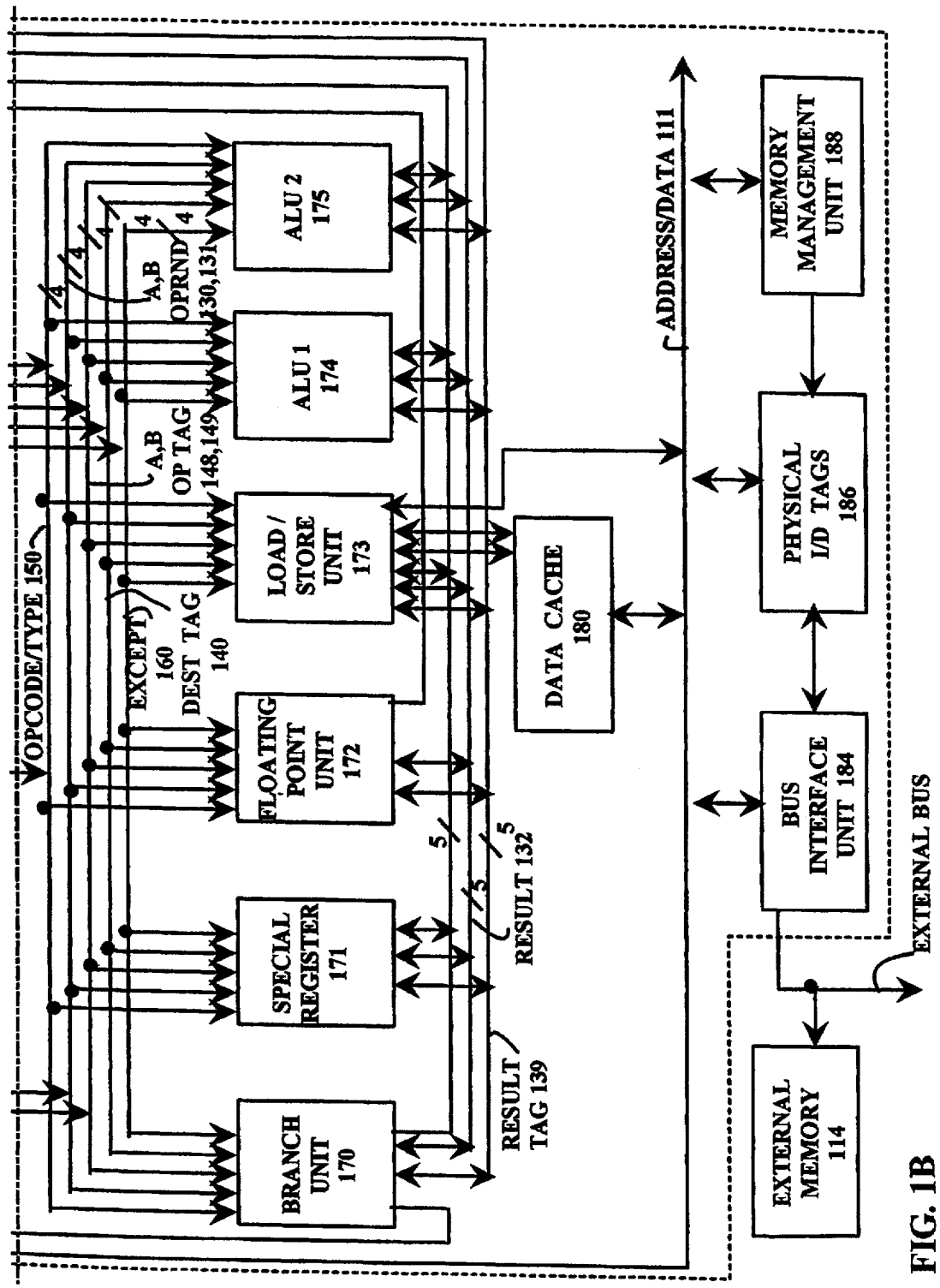
FIG. 1 is an architecture-level block diagram of a processor which implements a resynchronization response.

The architecture of a superscalar processor 110 having an instruction set for executing integer and floating point operations is shown in FIG. 1. A 64-bit internal address and data bus 111 communicates address, data, and control transfers among various functional blocks of the processor 110 and an external memory 114. An instruction cache 116 parses and pre-decodes CISC instructions. A byte queue 135 transfers the predecoded instructions to an instruction decoder 118, which maps the CISC instructions to respective sequences of instructions for RISC-like operations ("ROPs"). The instruction decoder 118 generates type, opcode, and pointer values for all ROPs based on the pre-decoded CISC instructions in the byte queue 135.

A suitable instruction cache 116 is described in further detail in U.S. Pat. No. 5,689,672 issued on Nov. 18, 1997 (David B. Witt and Michael D. Goddard, "Pre-Decode Instruction Cache and Method Therefor Particularly Suitable for Variable Byte-Length Instructions"). A suitable byte queue 135 is described in additional detail in U.S. patent application Ser. No. 08/311,286 filed on Sep. 23, 1994 (David B. Witt "Speculative Instruction Queue and Method Therefor Particularly Suitable for Variable Byte-Length Instructions"), continued from U.S. patent application Ser. No. 08/145,902 filed on Oct. 29, 1993 now abandoned. A suitable instruction decoder 118 is described in further detail in U.S. patent application Ser. No. 08/628,389, filed Apr. 5, 1996 (David B. Witt and Michael D. Goddard "Superscalar Instruction Decoder", continued from U.S. patent application Ser. No. 08/146,383 filed on Oct. 29, 1993 now abandoned. Each of these patent applications is incorporated herein by reference in its entirety.

The instruction decoder 118 dispatches ROP operations to functional blocks within the processor 110 over various busses. The processor 110 supports dispatching of up to four ROPs, completion of up to five ROP results, and handling of results of up to sixteen speculatively executed ROPs, all in concurrence. A type code for identifying a functional unit to execute an ROP is communicated over four opcode/type busses 150. Up to four sets of pointers to the A and B source operands and to a destination register are furnished over respective A-operand pointers 136, B-operand pointers 137 and destination register pointers 143 by the instruction decoder 118 to a register file 124 and to a reorder buffer 126. Register file 124 and reorder buffer 126 in turn furnish the appropriate "predicted executed" versions of the RISC operands A and B to various functional units on four pairs of 41-bit A-operand busses 130 and B-operand busses 131. Associated with the A and B-operand busses 130 and 131 are operand tag busses, including four pairs of A-operand tag busses 148 and B-operand tag busses 149. When operand data is unavailable for placement on an operand bus, a tag that identifies an entry in reorder buffer 126 for receiving the result when it becomes available is loaded onto a corresponding operand tag bus. The four pairs of operand and operand tag busses correspond to four ROP dispatch positions. The instruction decoder, in cooperation with reorder buffer 126, specifies four destination tag busses 140 for identifying an entry in reorder buffer 126 that will receive results from the functional units after an ROP is executed. A functional unit executes an ROP, copies the destination tag onto one of five result tag busses 139, and places a result on a corresponding one of five result busses 132 when the result is available. A functional unit directly accesses a result on result busses 132 when a corresponding tag on result tag busses 139 matches the operand tag of an ROP awaiting the result.

The instruction decoder 118 dispatches opcode information, including an opcode and an opcode type, that accompanies the A and B source operand information via four opcode/type busses 150.

Processor 110 includes several functional units, such as a branch unit 170, a special register block 171, a floating point functional unit 172, a load/store functional unit 173 and two arithmetic logic units (ALU) 174 and 175. Branch unit 170 validates a conditional branch prediction, which allows an adequate instruction-fetch rate in the presence of branches and achieves performance gains with multiple instruction issue. Under certain conditions, branch unit 170 redirects the order of fetching and dispatching of instructions through signals to instruction cache 116 via a target pc bus 122. A suitable branch prediction system, including a branch unit 170 and instruction decoder 118, is described in further detail in U.S. Pat. No. 5,136,697 (William M. Johnson "System for Reducing Delay for Execution Subsequent to Correctly Predicted Branch Instruction Using Fetch Information Stored with each Block of Instructions in Cache"), which is incorporated herein by reference in its entirety. Each functional unit 170 through 175 has respective reservation stations (not shown) having inputs connected to the operand busses 130 and 131 and the opcode/type busses 150.

Reservation stations allow dispatch of speculative ROPs to the functional units.

Load/store unit 173 is connected to a data cache 180 and is used for communicating data between the functional units, register file 124 and reorder buffer 126 and data cache 180. Data cache 180 is organized using an architecture which is similar to that of instruction cache 116. Both are linearly-addressable caches which include a store array and a corresponding tag array. ALU 174 and ALU 175 execute arithmetic instructions that operate on numeric data encoded in binary. Operations include add, subtract, multiply and divide as well as increment, decrement, compare and change sign. Signed and unsigned binary integer mathematics are supported. ALU 175 executes right and left shift and rotate instructions. Arithmetic and shift and rotate instructions update the zero flag (ZF), carry flag (CF), sign flag (SF) and overflow flag (OF). CF is updated for unsigned integers. SF and OF are updated for signed integers. ZF relates to both signed and unsigned integers and is set when all bits of the result are clear.

Register file 124 is a physical storage memory including mapped CISC registers for storing data used in integer and floating point instructions. Register file 124 is addressed by up to two register pointers of the A and B-operand pointers 136 and 137 which designate a register number for source operands for each of up to four concurrently dispatched ROPs. These pointers point to a register file entry and the values in the selected entries are placed onto operand busses of the operand busses 130 and 131 through eight read ports. Integers are stored in 32-bit <31:0> registers and floating point numbers are stored in 82-bit <81:0> floating point registers of register file 124. Register file 124 receives integer and floating point results of executed and nonspeculative operations from reorder buffer 126 over four 41-bit writeback busses 134. Results that are written from reorder buffer 126 to register file 124 as ROPs are retired. Flags that result from execution of ROPs are retired in a manner similar to retirement of result data. Flags are retired from reorder buffer 126 to a status flags register 125 over EFLAGS lines 145.

Reorder buffer 126 is a circular FIFO which tracks the relative order of speculatively executed ROPs. The reorder buffer 126 storage locations are dynamically allocated for sending retiring results to register file 124 and for receiving results from the functional units. When an instruction is decoded, its destination operand is assigned to the next available reorder buffer location, and its destination register number is associated with this location as a destination tag, in effect renaming the destination register to the reorder buffer location. The register numbers of its source operands are used to access reorder buffer 126 and register file 124 simultaneously. If reorder buffer 126 does not have an entry whose destination tag matches the source operand register number, then the value in register file 124 is selected as the operand. If reorder buffer 126 does have one or more matching entries, the value of the most recently allocated matching entry is furnished if it is available. If the result is unavailable, a tag identifying this reorder buffer entry is furnished on an operand tag bus of A and B-operand tag busses 148 and 149. The result or tag is furnished to the functional units over the operand busses 130, 131 or operand tag busses 148, 149, respectively. When results are obtained from completion of execution in the functional units 170 through 175, the results and their respective result tags are furnished to reorder buffer 126, as well as to the reservation stations of the functional units, over five bus-wide result busses 132 and result tag busses 139. Of the five result and result tag and status busses, four are general purpose busses for forwarding integer and floating point results to the reorder buffer. Additional fifth result and result tag and status busses are used to transfer information, that is not a forwarded result, from some of the functional units to the reorder buffer. For example, status information arising from a store operation by the load/store functional unit 173 or from a branch operation by the branch unit 170 is placed on the additional busses. The additional busses conserve result bus bandwidth. Floating point (FP) flag busses 138 communicate floating point flag information from floating point functional unit 172 to reorder buffer 126. Reorder buffer 126 handles exceptions and mispredictions, and maintains the state of certain registers, including a program counter (not shown) and execution flags. Generally, an exception condition is detected by a functional unit. Functional units, via a status bus 141, communicate codes to reorder buffer 126 that indicate an occurrence of the exception condition. Reorder buffer 126 subsequently informs all functional units of the exception condition using an exception line 160. A suitable unit for a RISC core, including a reorder buffer is disclosed in U.S. Pat. No. 5,651,125, issued Jul. 22, 1997 (David B. Witt and Michael D. Goddard "Superscalar Instruction Decoder"), continued from U.S. patent application Ser. No. 08/146,382 filed on Oct. 29, 1993 now abandoned, which is incorporated by reference in its entirety.

The instruction decoder 118 dispatches ROPs "in-order" to the functional units. The order is maintained by the order of reorder buffer entries. The functional units queue ROPs for issue when all previous ROPs in the queue have completed execution, all source operands are available either via the operand busses or result busses, and a result bus is available to receive a result. Thus, functional units complete ROPs "out-of-order". The dispatch of operations does not depend on the completion of the operations so that, unless the processor is stalled by the unavailability of a reservation station queue or an unallocated reorder buffer entry, instruction decoder 118 continues to decode instructions regardless of whether they can be promptly completed.

The data path includes registers in register file 124 and a result field in each entry of reorder buffer 126, as well as the operand, result and writeback busses. In one embodiment, the processor has a 41-bit data path to accommodate floating point operations. The 32-bit data path is mapped into bits <31:0> of a 41-bit structure. This embodiment is described in U.S. Pat. No. 5,574,928, issued Nov. 12, 1996 (Scott A White, Michael D. Goddard and William M. Johnson, "Mixed Integer/Floating Point Fixed Pitch Core"), which is incorporated herein by reference in its entirety.

Processor 110 includes an internal address/data (IAD) bus 111 which is connected to instruction cache 116 and to bus interface unit 184. Bus interface unit 184 is connected to a main memory or external memory 114 so that processor 110 is provided with external memory access. IAD bus 111 is also connected to load/store functional unit 173. Processor 110 also includes memory management unit (MMU) 188 and bus interface unit 184 (BIU). Memory management unit 188 is connected with IAD bus 111 and physical I/D tags block 186. A translation lookaside buffer TLB (740 of FIG. 15) within memory management unit (MMU) 188 is connected between IAD bus 111 and physical tags I/D block 186 as shown. Bus interface unit 184 is connected to physical I/D tags block 186 and IAD bus 111.

Physical tags I/D block 186 is connected to IAD bus 111 to track physical addresses of instructions and data in instruction cache 116 and data cache 180, respectively. More specifically, physical tags I/D block 186 includes physical instruction/data tag arrays which maintain the physical addresses of the instruction cache 116 and the data cache 180. The physical instruction tag array of block 186 mirrors the organization for the corresponding linear instruction tag array of the instruction cache 116. Similarly, the organization of the physical data tag array within block 186 mirrors the organization of the corresponding linear data tag array within instruction cache 116.

Bus interface unit 184 interfaces IAD bus 111 to external apparatus such as memory 114. IAD bus 111 is a global 64-bit shared address/data/control bus that is used to connect the different components of processor 110. IAD bus 111 is used to refill the cache block, write modified blocks and pass data and control information to functional blocks such as special register block 171, load/store functional unit 173, data cache 180, instruction cache 116, physical I/D tags block 186 and translation lookaside buffer 188 as well as bus interface unit 184.

Processor 110 executes sequences of instructions which form computer programs. Computer programs are typically stored on non-volatile storage media such as a hard disk or floppy disk. Programs are loaded from the storage media into main memory 114 and run by processor 110 via bus interface unit 184.

Figure 2:
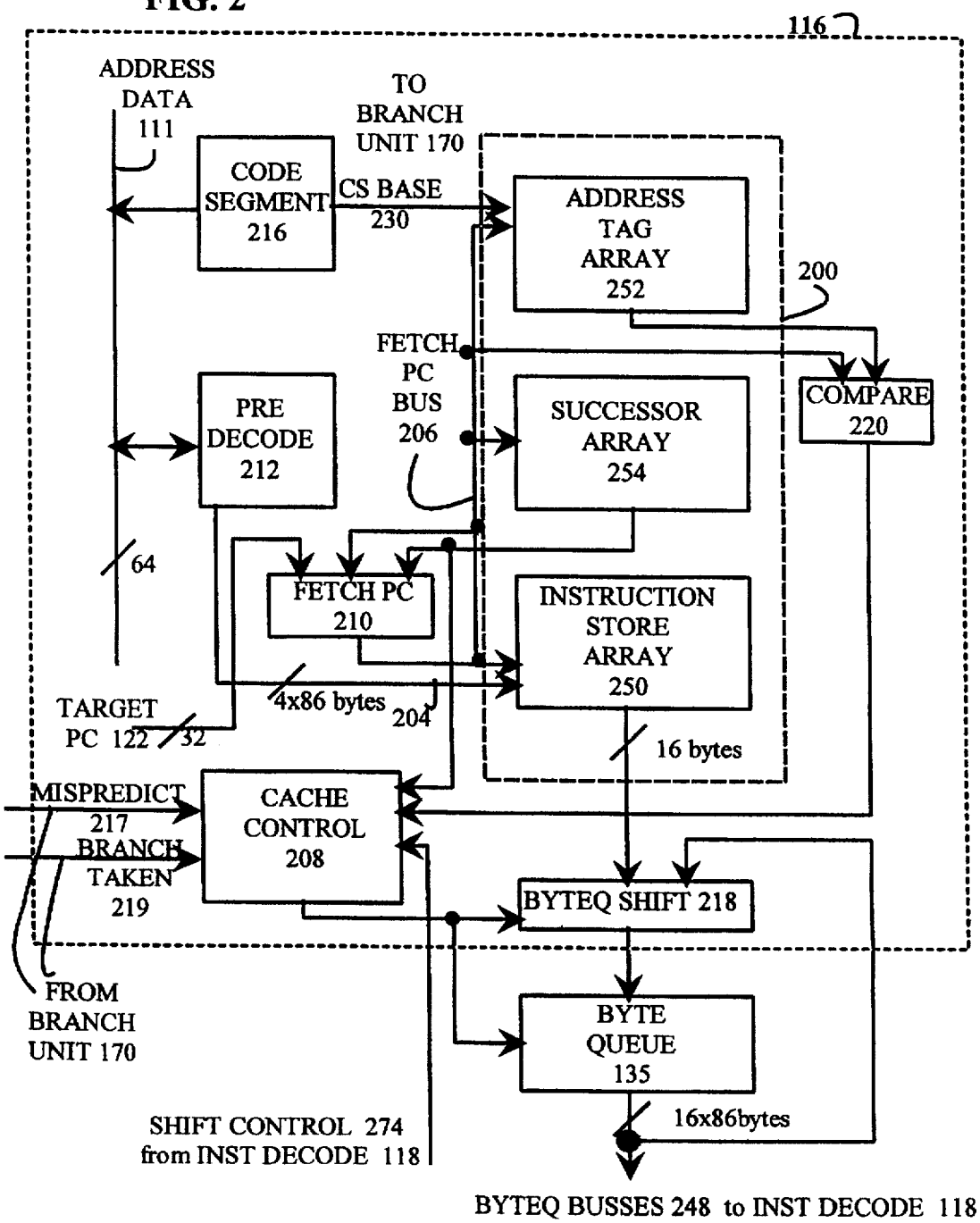
FIG. 2 is an architecture-level block diagram of an instruction cache which includes features for implementing processor resynchronization.

After storage in main memory 114, instructions are passed via bus interface unit 184 to instruction cache 116, where instructions are temporarily held. Instruction cache 116 depicted in FIG. 2 predecodes prefetched x86 instruction bytes to assist instruction decoder 118 as it concurrently (in a single clock cycle) decodes and maps up to four x86 instructions into ROPs, and dispatches up to 4 ROPs in parallel. Instruction cache 116 includes a cache control 208, a fetch PC 210, a fetch pc bus 206, a predecode block 212, a code segment block 216, a byteq shift block 218 and a cache array 200 which is organized into three arrays: an instruction store array 250, an address tag array 252 and a successor array 254.

Code segment block 216 holds copies of a code segment descriptor which is used to check validity of a requested access. Code segment block 216 furnishes a code segment (CS) base value, which is conveyed to branch unit 170 over CS base lines 230, to convert logical addresses to linear addresses. Predecode block 212 receives pre-fetched x86 instruction bytes via an internal address/data bus 111, assigns predecode bits for each x86 instruction byte and writes the predecoded x86 instruction bytes using a group of four busses 204 into the instruction store array 250. Byte queue 135 buffers predicted-executed instructions from cache array 200 and presents up to 16 valid predecoded x86 instruction bytes to instruction decoder 118 on a group of 16 busses 248. Byte queue shift block 218 rotates, masks and shifts instructions on x86 boundaries. Shifts occur in response to a signal on shift control lines 274 when all ROPs of an x86 instruction are issued by instruction decoder 118. Cache control 208 generates control signals that manage various instruction cache 116 operations.

Fetch PC 210, communicating via fetch pc bus 206, identifies instructions to be fetched during sequential and nonsequential accesses of the three arrays within cache array 200. Middle-order bits of fetch PC 210 are a cache index which address an entry from each array for retrieval. High-order bits are an address tag which is compared to the tag addressed and retrieved from the address tag array 252. A match indicates a cache hit. This comparison operation is furnished by compare block 220. Low-order bits are an offset into the addressed and retrieved entry from the instruction store array 250 which identifies the addressed byte. Fetch PC 210, cache control 208, and cache array 200 act together to maintain and redirect the address conveyed on the fetch pc bus 206. Fetch PC 210 updates from one cycle to the next, either by maintaining the same address, incrementing the address to the next cache entry, receiving an address via the internal address/data bus 111 or loading the address from target pc bus 122. The target PC is used upon activation by cache control 208 in response to a branch mispredict flag 217 which is conveyed from reorder buffer 126 when a branch instruction is retired.

Address tag array 252 entries include an address tag, a valid bit and byte-valid bits corresponding to each of the instruction store array 250 bytes. Cache hits are identified using the address tag. The valid bit indicates whether the address tag is valid. The byte-valid bits indicate whether the predecoded x86 instruction byte contains a valid x86 instruction byte and valid predecode bits. After a cache miss, an entry is allocated at an index location within the address tag array 252 by writing the high-order bits of the fetch PC address conveyed on bus 206 into the address tag, setting the tag valid bit to indicate a valid address tag, and clearing all of the byte-valid bits to invalidate any instruction bytes remaining in the corresponding entry within the instruction store array 250 from previous activity. As predecoded instruction bytes are written into a previously allocated entry within the instruction store array 250, the respective byte-valid bits are likewise set in the corresponding entry within the address tag array 252.

Successor array 254 supports branch prediction. Successor array 254 entries include a successor index, a successor valid bit (NSEQ) and a block branch index (BBI). NSEQ is asserted to indicate that the successor array is addressing the instruction store array 250. NSEQ is cleared when no branch is "predicted taken" within the instruction block. BBI is defined only when NSEQ is asserted. It designates the byte location within the current instruction block of the last instruction byte predicted to be executed. The successor index includes an address index into the cache, an indicator of the column of the 4-way set-associative array that contains the successor block of instruction bytes (thus avoiding the time otherwise required to determine which column "hits" at this address), and an indicator of the particular byte within the successor block which is predicted to be executed next. The successor index indicates where the next predicted-executed byte of the instruction is located within the cache—the instruction starting at the target PC of the speculative branch.

A branch instruction is performed in coordinated operations of instruction cache 116 and branch unit 170. For example, instruction cache 170 predicts the branch as not-taken and continues to fetch instructions sequentially. If the branch is later determined by the branch unit 170 to be taken, the prediction is incorrect and the branch unit 170 asserts the branch mispredict flag 217 and a branch taken flag 219. Instruction cache 116 flushes byte queue 135 of speculative instructions. Branch unit 170 redirects instruction cache 116 by passing the correct target PC back to instruction cache 116 on target pc bus 122. Fetch PC 210 directs the instruction stream to the target pc address and begins refilling byte queue 135. Successor array 254 entry containing the mispredicted branch instruction is modified to indicate a predicted branch by asserting the NSEQ bit, setting the BBI to point to the last byte of the branch instruction, and setting the successor index to indicate the location within instruction cache 116 of the target instruction. The successor index stores the index, column, and offset of the target instruction, rather than the complete address. The fetch PC address is reconstructed by accessing the cache block using the index and column given by the successor index, and by concatenating the address tag high-order bits stored within that block to the index and offset bits from the previous successor index.

The reconstructed branch target PC from fetch PC 210 passes from instruction cache 116 to instruction decoder 118 on fetch pc bus 206 so that instruction decoder 118 maintains a decode PC as instructions are dispatched. Instruction decoder 118 compares the branch target PC received via fetch pc bus 206 to the branch instruction position that is designated by the marker bit within byte queue 135 and a corresponding field identifying the cache column holding the branch instruction. Instruction decoder 118 increments bytes off the current decode PC as instruction bytes are dispatched, and loads the new branch target PC when the first byte of the branch instruction is loaded into instruction decoder 118 from byte queue 135.

Instruction decoder 118, as it dispatches a branch instruction to branch unit 170, sends the decode PC, a branch offset of the target instruction and a predict status of the branch. Information is used by branch unit 170 for executing the branch instruction and determining subsequently if the prediction was correct. For a correct prediction, execution proceeds. But if a misprediction occurs, branch unit 170 sends the correct target PC resulting from the branch to instruction cache 116. When a predicted-taken branch is mispredicted, the NSEQ field in the previous cache block (containing the mispredicted branch) is reset. The other fields, the BBI and successor index are ignored whenever NSEQ is reset, thus indicating a sequential access (in other words, a predicted not-taken branch). A predicted-taken branch which references a negative offset target PC and which is mispredicted (not actually taken), is not updated but is maintained as a predicted-taken branch.

Figure 3B:
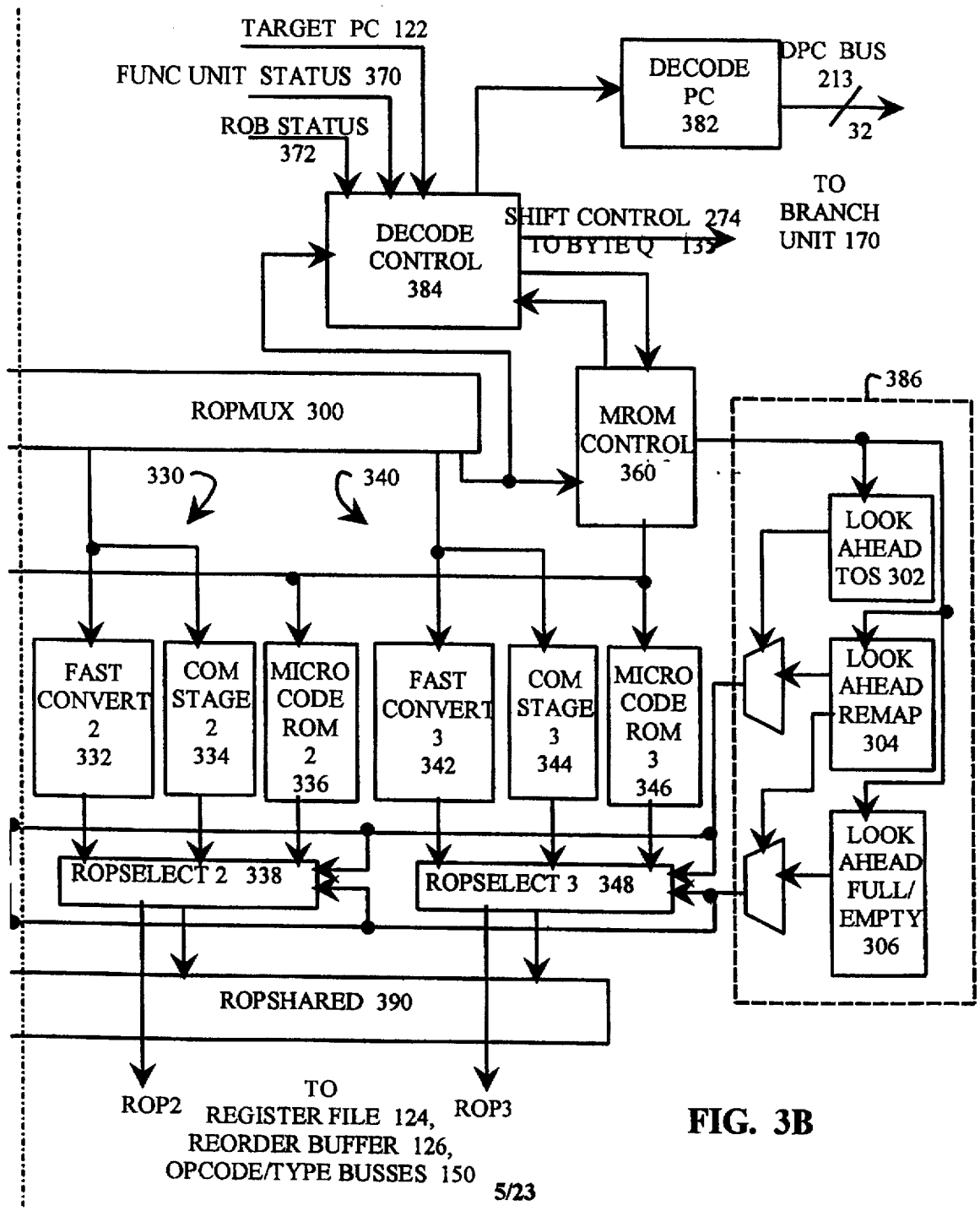
FIG. 3 is an architecture-level block diagram of an instruction decoder which includes features for implementing processor resynchronization.

Instruction decoder 118 depicted in FIG. 3 receives pre-decoded x86 instruction bytes from byte queue 135, translates them into respective sequences of ROPs, and dispatches ROPs from multiple dispatch positions. The translation is handled in a hardwired fast conversion path for most simple instructions. Complex instructions which translate to more than three ROPs and infrequently used instructions are handled by sequences contained in microcode ROM.

Information used to translate an ROP includes identifiers of a functional unit type, a RISC-like instruction to be executed by the functional unit, and source and destination pointers. Instruction decoder 118 selects and augments ROP information from either the fastpath or the microcode ROM and furnishes complete ROPs for execution by the functional units.

An ROP multiplexer 300 concurrently directs one or more pre-decoded x86 instructions in byte queue 135 to one or more available dispatch positions, beginning with the x86 instruction at the head of byte queue 135. ROP dispatch positions ROP 0, 1, 2 and 3 (310, 320, 330 and 340) include respective fast converters 0, 1, 2 and 3 (in order, 312, 322, 332, and 342); respective common stages 0, 1, 2 and 3 (314, 324, 334, and 344); and respective microcode ROMs 0, 1, 2 and 3 (316, 326, 336, and 346). Each dispatch position includes a common stage, a fast converter and an MROM. MROMs 316, 326, 336, and 346 are controlled by microcode ROM (MROM) controller 360.

MROMs are ROM arrays for handling x86 instructions that are not convertible in the fast converters, including complex interactive instructions such as a CALL gate instruction, a STRING move instruction, and transcendental floating point routines. For MROM path instructions, MROM controller 360 forms a microcode ROM address known as an entry point, and based on the entry point, reads the ROP sequence from the microcode ROM instructions stored in the MROM 0, 1, 2 and 3 (316, 326, 336, and 346) at four ROPs per cycle.

The common stages handle x86 instruction conversion operations that are common to fastpath and microcode ROM instructions. Each common stage isolates certain bits of instruction input signals and furnishes these bits to ROP selects for setting destination and operand pointers and selecting registers. The signals select an address size (32 or 16-bits), determine doubleword or word operand byte sizes, select special registers, specify operands for particular addressing modes and define how the displacement field is handled. Thus, all x86 addressing modes for the fastpath and the microcode mapped path are handled in common.

MROM controller 360 performs control functions such as furnishing instruction type and opcode information, predicting the number of ROPs that fill a dispatch window, informing instruction cache 116 how to shift byte queue 135 in view of the prediction, informing ROP multiplexer 300 of the number of ROPs to dispatch for the x86 instruction at the head of byte queue 135, and accessing microcode and control ROM.

MROM controller 360 controls ROP sequencing using two techniques: instruction-level sequence control and microbranch ROPs. Both instruction-level branches and microbranch ROPs are dispatched to branch unit 170 for execution and are subject to correction on mispredictions. The instruction-level sequence control field provides several capabilities: microcode subroutine call/return, unconditional branches to block-aligned MROM locations, processor state-based conditional branching, and end-of-sequence identifying. When an instruction-level sequence ROP is dispatched, an MROM address (rather than an instruction address) is sent for target PC formation or branch correction.

Microbranch ROPs furnish unconditional branching and conditional branching based on a register value being zero, non-zero, positive, or negative. Microbranch ROPs are dispatched to branch unit 170 for execution and have a delayed effect. MROM controller 360 accepts microcode ROM entry points initiated by microbranch misprediction logic in branch unit 170. Microcode entry points generated by branch unit 170 are communicated to instruction decoder 118 over target pc bus 122. On a microbranch correction, branch unit 170 indicates to instruction decoder 118 via target pc bus 122 that the correction address is an MROM address rather than a PC.

ROPselects 0, 1, 2 and 3 (318, 328, 338 and 348) select outputs of either the fast converter or the MROM in combination with the outputs of the common stage and direct this information to register file 124, reorder buffer 126 and to various functional units. Dispatched information includes A and B operand and destination pointers, instruction type and opcode, interrupt and backup enables, instruction end, and immediate field constant values to drive immediate address or constants to the functional units. Additional information applied to branch unit 170 includes a branch predicted taken signal which indicates to branch unit 170 the prediction at branch instruction dispatch.

ROPshared 390 and ROPselects 0, 1, 2 and 3 (318, 328, 338 and 348) cooperatively select operands for instructions dispatched to the various functional units to generate dispatch information used by resources that are shared among all dispatch positions. ROPshared 390 furnishes ROP opcode encodings to the opcode/type busses 150 for dispatch to functional units.

Figure 9:
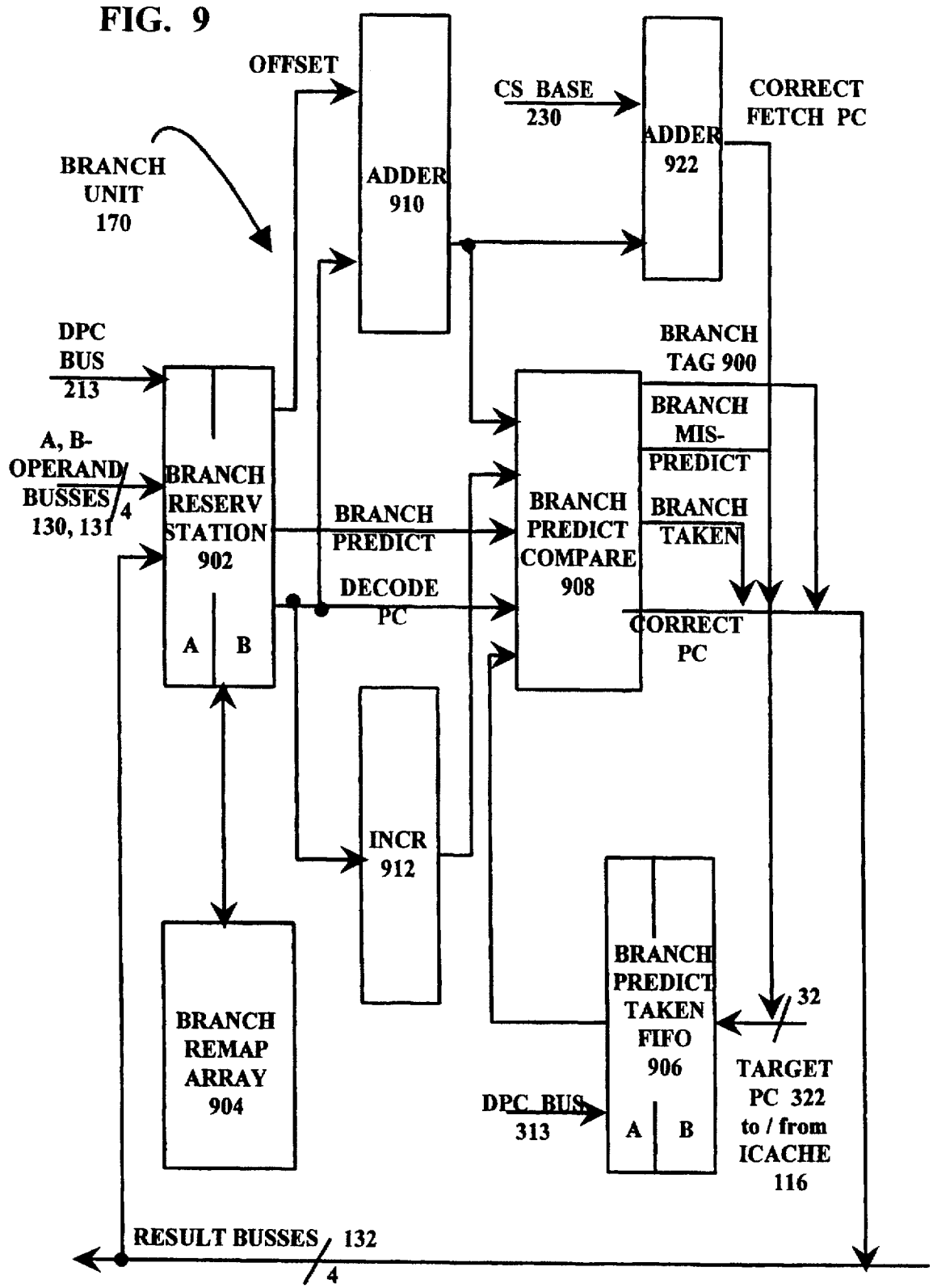
FIG. 9 is an architecture-level block diagram of a branch unit which includes features for implementing processor resynchronization.

Branch unit 170, in addition to receiving the opcode, receives other ROPshared 390 outputs, including a 1-bit exchange underflow signal, a 2-bit cache column select identifier, a 1-bit branch predicted taken select signal, a 1-bit microbranch indicator, and a 1-bit signal that indicates whether branch unit 170 should write a predicted taken address on target pc bus 122 to a branch predicted taken FIFO (906 of FIG. 9). Also, a 3-bit read flag pointer, which identifies an integer flag source operand, is set based on the position of the first undispatched ROP mapped to branch unit 170. If no ROP is mapped to branch unit 170, the read flag pointer is set to 0. A 2-bit usage indicator is encoded to set the dispatch position of the first undispatched ROP mapped to branch unit 170.

Instruction decoder 118 includes a decode PC block 382, a decoder control block 384 and a decoder stack 386. Decoder control block 384 determines the number of ROPs to be issued based on the number of ROPS in byte queue 135, x86 instruction boundary positions, the status of the functional units (from lines 370) and the status of reorder buffer 126 (from lines 372). Decoder control block 384 communicates the number of ROPs issued to byte queue 135 on shift control lines 274 so that byte queue 135 shifts by the number of fully executed x86 instructions and the beginning of byte queue 135 is always the start of the next full x86 instruction. When an exception or branch misprediction occurs, decoder control block 384 prevents issue of additional ROPs until a new fetch PC is entered or an entry point is sent to the MROM for an exception micro-code routine.

Decode PC block 382 tracks logical program address values of each x86 instruction sent from byte queue 135. When byte queue 135 detects a nonsequential fetch, it designates a new address and sends it to decode PC block 382. For sequential instructions that follow branches, decode PC block 382 counts the number of x86 bytes in byte queue 135 between the start and end positions of the unbroken sequence and adds this number to the current PC to determine the next PC following the sequence. The decode PC is conveyed to branch unit 170 over DPC bus 213.

Decoder stack 386 holds a lookahead copy of various floating point stack pointer arrays and registers including a lookahead top of stack (TOS) pointer 302, a lookahead remap array 304 and a lookahead full/empty array 306. These arrays and pointers handle speculative modification of the floating point stack resulting from speculative issue of ROPs that affect the stack, including handling of the stack to return to a correct state upon a branch misprediction or exception. Lookahead remap array 304 is an array of pointers, each designating one register of a stack array. In the illustrative embodiment of the stack, lookahead remap array 304 is an array of eight 3-bit pointers, each identifying an element of a floating point stack array 500 (shown in FIG. 5) within register file 124. Lookahead TOS 302 is a 3-bit pointer which selects one pointer of lookahead remap array 304. A lookahead full/empty array 306 is an array of single bits designating whether a stack location is full (1) or empty (0).

In a superscalar processor, that an operation is dispatched does not confirm that it should be executed. Branches are predicted and some of the predictions are incorrect. It is advantageous to rapidly recover from mispredicted branches. Lookahead remap array 304, lookahead TOS 302 and lookahead full/empty array 306 accelerate misprediction recovery by saving a copy of the speculative state of the stack. For operations that modify the floating point stack, instruction decoder 118, as it decodes instructions, updates a future state of floating point stack array 500. When instruction decoder 118 decodes an instruction that increments or decrements the stack pointer, it updates lookahead TOS 302. In a similar manner, when instruction decoder 118 decodes a floating point exchange instruction (FXCH), it adjusts the future state of lookahead remap array 304 by exchanging pointers as specified by the instruction. Since the state of the stack may change between any two branch instructions, stack information is preserved for every branch operation.

Figure 4A:
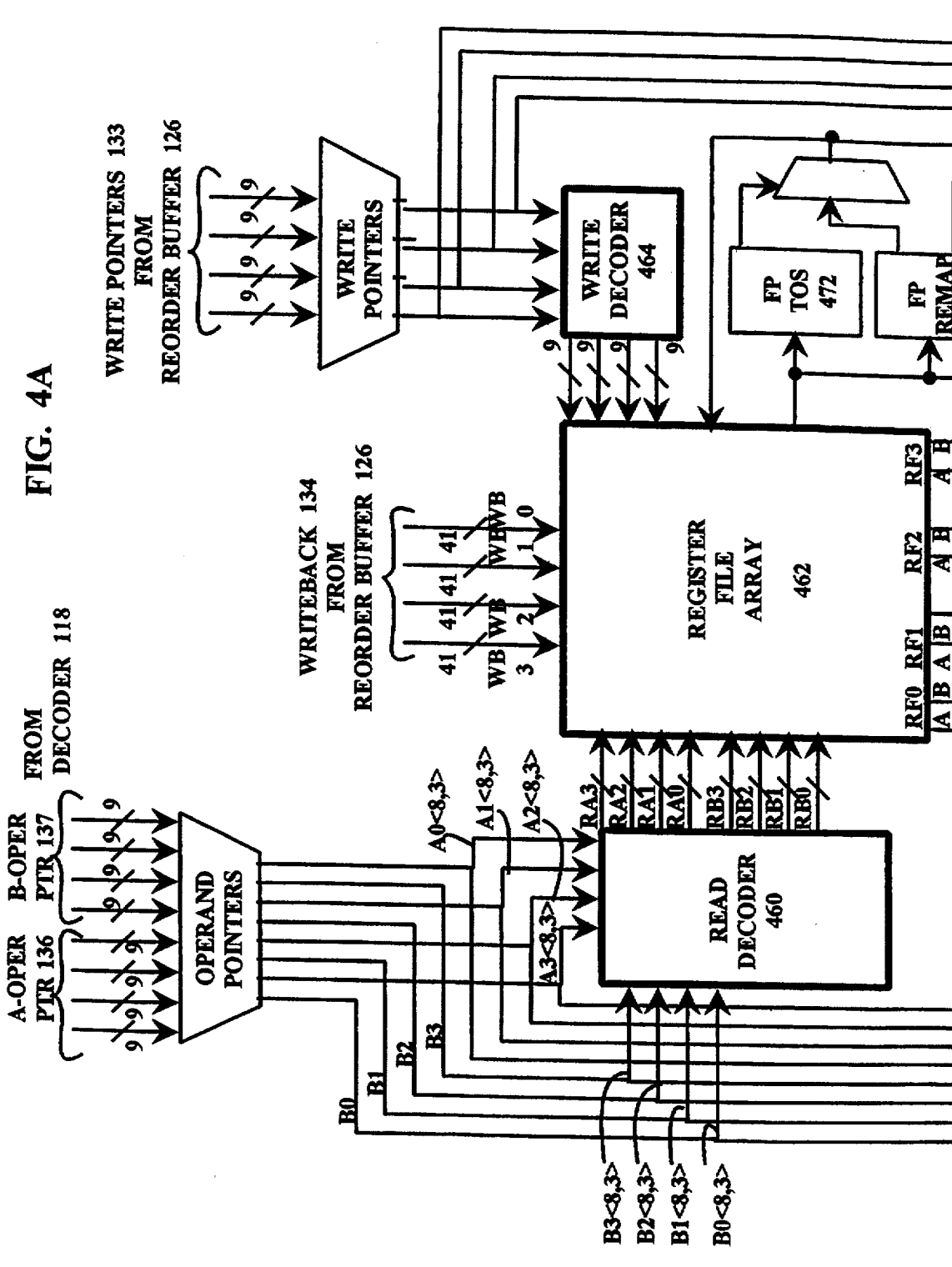
FIG. 4 is an architecture-level block diagram of a register file within the processor of FIG. 1.
Figure 4B:
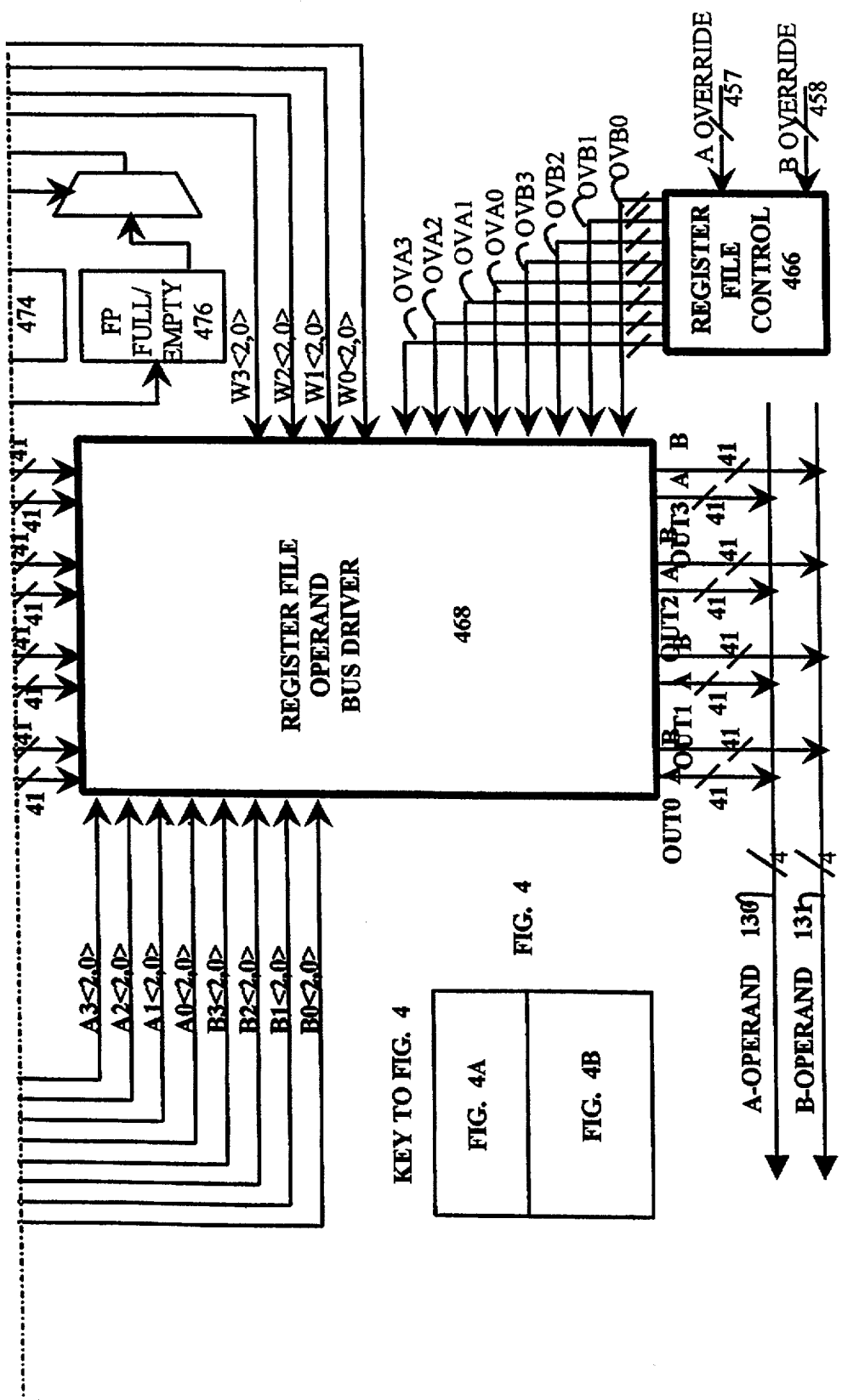

Referring to FIG. 4, register file 124 includes a read decoder 460, a register file array 462, a write decoder 464, a register file control 466 and a register file operand bus driver 468. Read decoder 460 receives the A and B-operand pointers 136 and 137 to address register file array 462 via four pairs of 64-bit A and B operand address signals RA0, RA1, RA2, RA3, RB0, RB1, RB2 and RB3. Register file control 466 receives override signals on A operand override lines 457 and B operand override lines 458 from the reorder buffer 126, which are then conveyed from the register file control 466 to the register file operand bus driver 468.

Register file array 462 receives result data from reorder buffer 126 via writeback busses 134. When a reorder buffer entry is retired in parallel with up to three other reorder buffer entries, result data for the entry is placed on one of writeback busses 134 and the destination pointer for that entry is placed on a write pointer 133 that corresponds to the writeback bus. Data on writeback busses 134 are sent to designated registers in register file array 462 in accordance with address signals on write pointers 133 that are applied to write decoder 464.

As it retires certain ROPs, reorder buffer 126 drives data to various floating point stack registers within the register file 124, including a floating point remap array 474, a floating point top of stack (TOS) register 472 and a floating point full/empty array 476. Floating point stack array 500, which is also located within the register file 124, is an array of eight 82-bit numeric registers for storing extended real data. Each register includes one sign bit, a 19-bit exponent field and a 62-bit significand field. The floating point remap array 474 is an array of eight pointers, each being a pointer to a register of the floating point stack array 500. Floating point TOS 472 is a 3-bit pointer which designates a pointer into floating point remap array 474. The floating point full/empty array 476 is an array of single bits that indicate whether a location of the stack array is full (1) or empty (0), each corresponding to an element of the floating point stack array 500.

Figure 5:
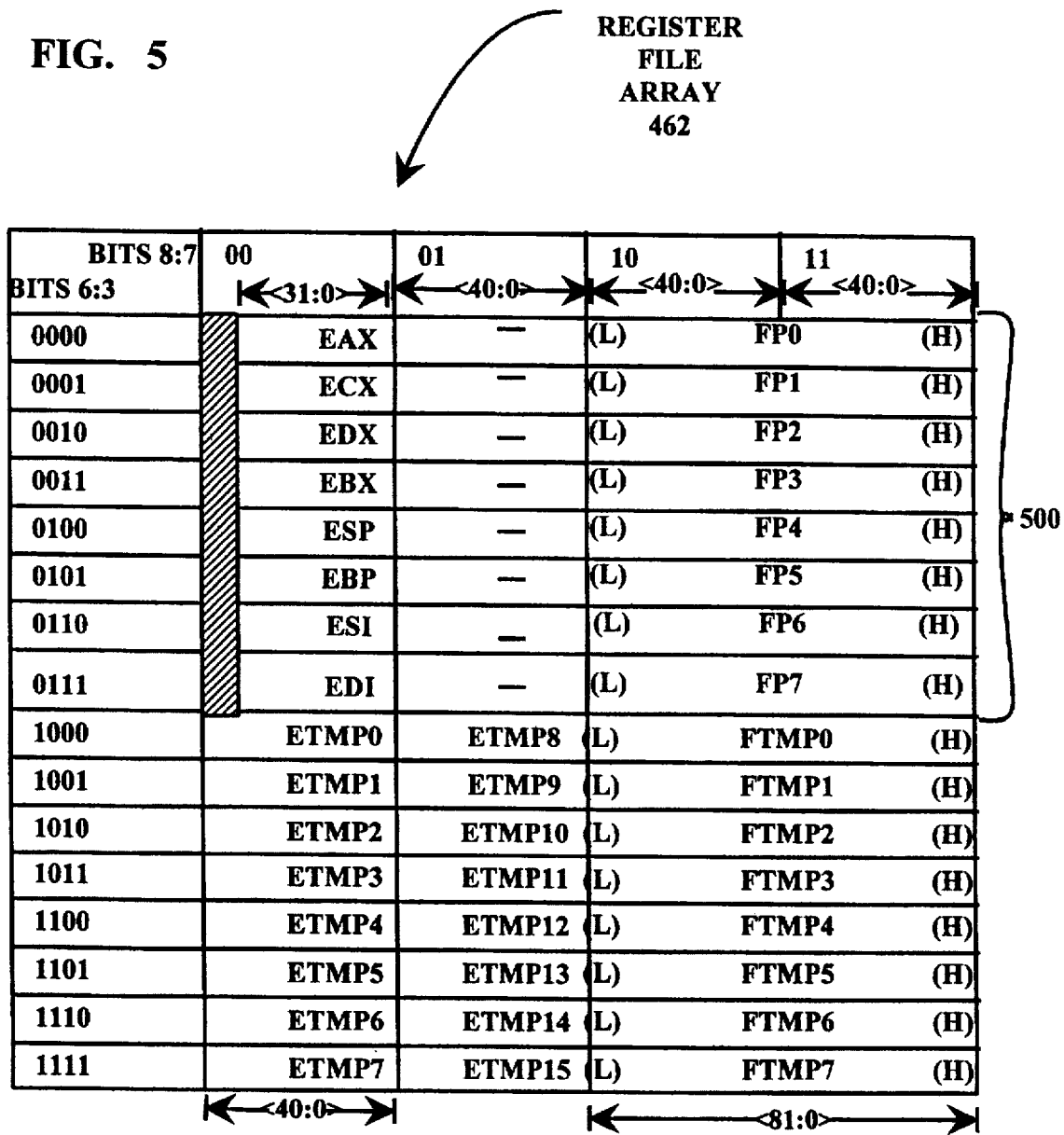
FIG. 5 is a pictorial representation illustrating a memory format in the register file shown in FIG. 4.

Register file array 462 includes multiple addressable registers for storing results operated upon and generated by processor functional units. FIG. 5 shows an exemplary register file array 462 with forty registers, including eight 32-bit integer registers (EAX, EBX, ECX, EDX, ESP, EBP, ESI and EDI), eight 82-bit floating point registers FP0 through FP7, sixteen 41-bit temporary integer registers ETMP0 through ETMP15 and eight 82-bit temporary floating point registers FTMP0 through FTXP7 which, in this embodiment, are mapped into the same physical register locations as the temporary integer registers ETMP0 through ETMP15. Floating point registers FP0 through FP7 are addressed as a floating point stack array 500, which are accessed using the stack arrays and registers within register file 124, the floating point remap array 474, TOS register 472 and full/empty array 476.

Figure 6A:
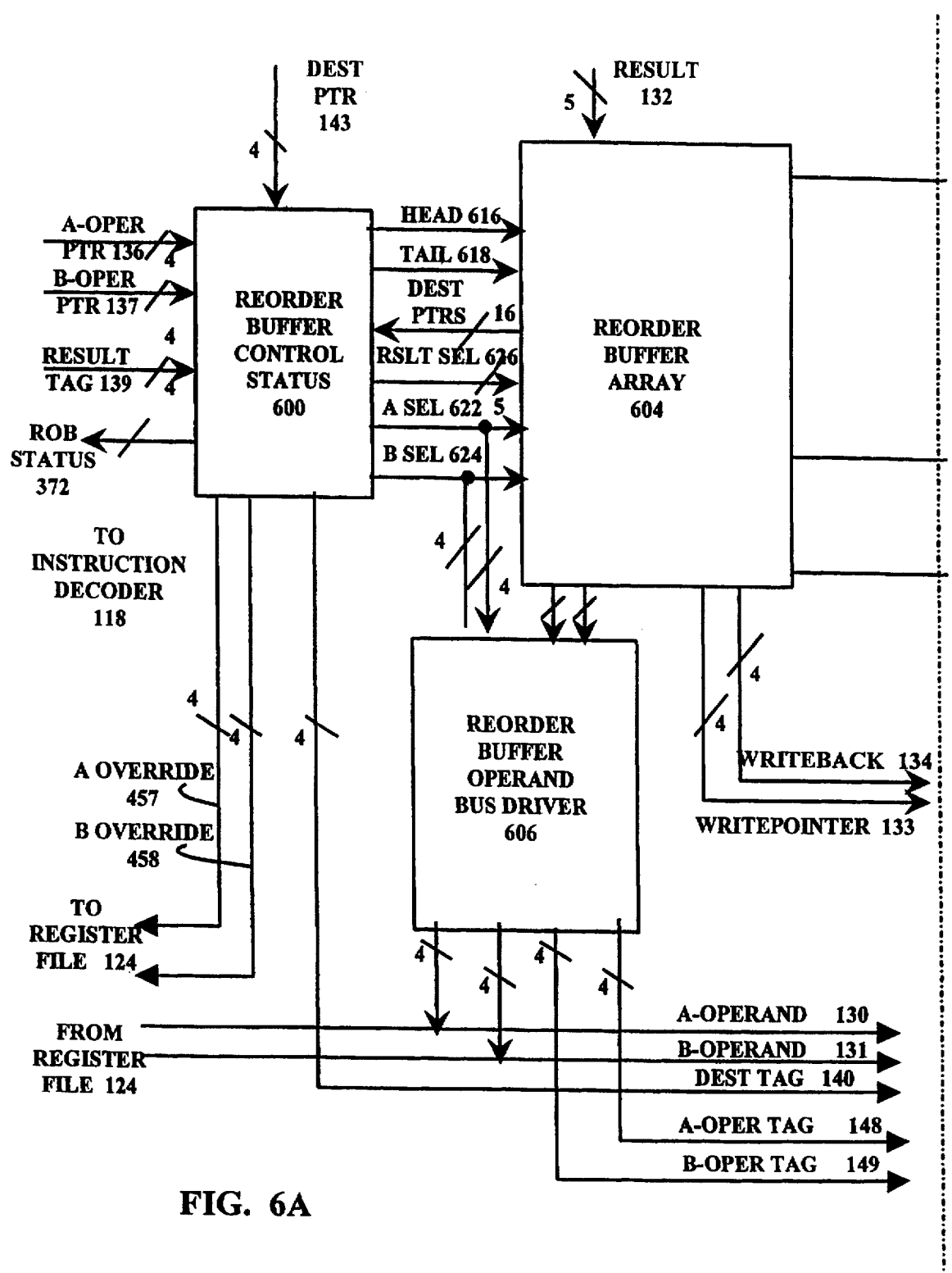
FIG. 6 is an architecture-level block diagram of a reorder buffer within the processor of FIG. 1 which includes features for implementing processor resynchronization.
Figure 6B:
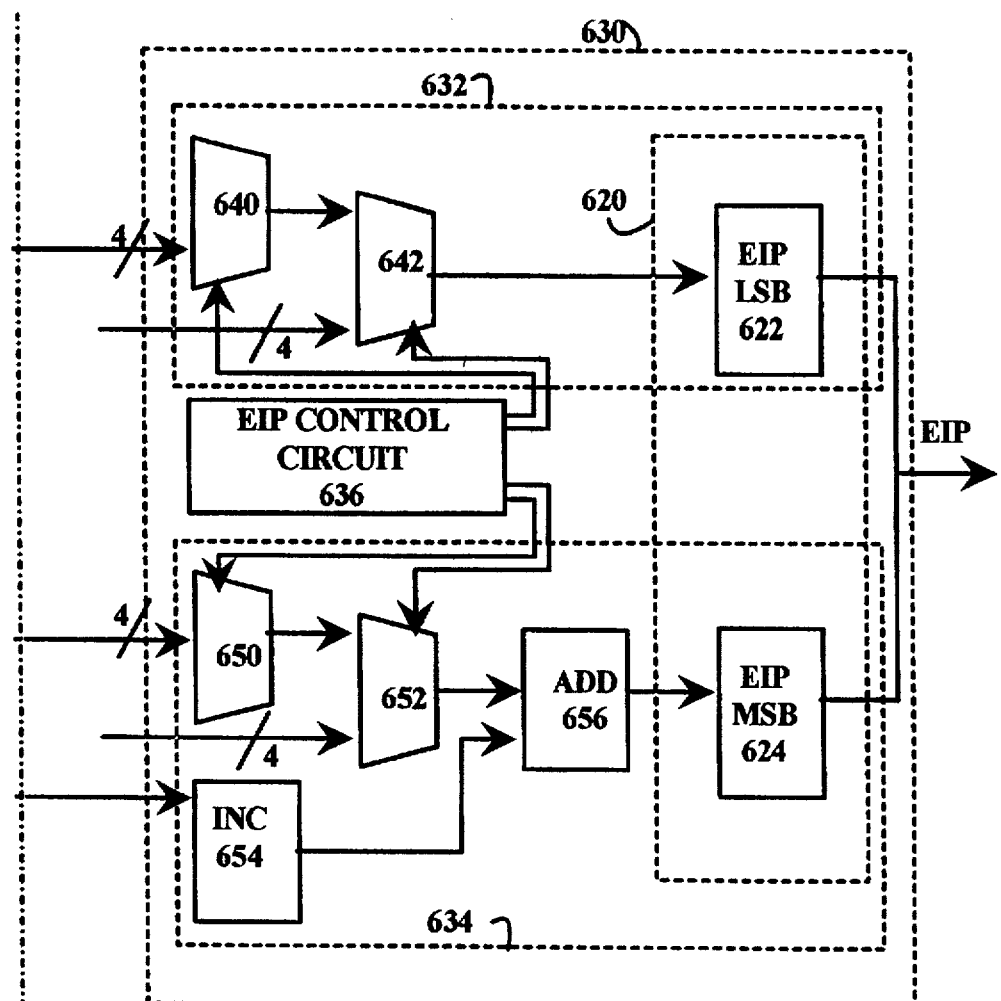
Figure 6:
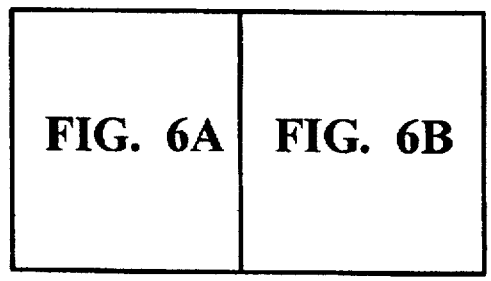

Referring to FIG. 6, reorder buffer 126 includes a reorder buffer (ROB) control and status block 600, a ROB array 604, a ROB operand bus driver 606 and an EIP generator circuit 630. ROB control and status block 600 is connected to A and B-operand pointers 136 and 137 and destination pointer (DEST REG) busses 143 to receive inputs which identify source and destination operands for an ROP. ROB array 604 is a memory array which is controlled by ROB control and status block 600. ROB array 604 is connected to result busses 132 to receive results from the functional units. Control signals, including a head 616, a tail 618, an A operand select, a B operand select and a result select signal, are conveyed from ROB control and status 600 to ROB array 604. These control signals select ROB array elements that are input from result busses 132 data and output to writeback busses 134, write pointers 133, A and B-operand busses 130 and 131, and A and B-operand tag busses 148 and 149. Sixteen destination pointers, one for each reorder buffer array element, are conveyed from ROB array 604 to ROB control and status 600 for performing dependency checking.

At ROP dispatch, a pointer of A or B-operand pointers 136 and 137 addresses ROB array 604, through the ROB control block 600, to designate the operand data to be applied to the ROB operand bus driver 606. ROB control and status 600 receives the operand pointers via the A and B-operand pointers 136 and 137 and the destination pointer via the destination register (DEST REG) busses 143, and writes the destination pointer in the destination pointer (DEST PTR<8:0>) field of the ROB array 604.

Figure 7:
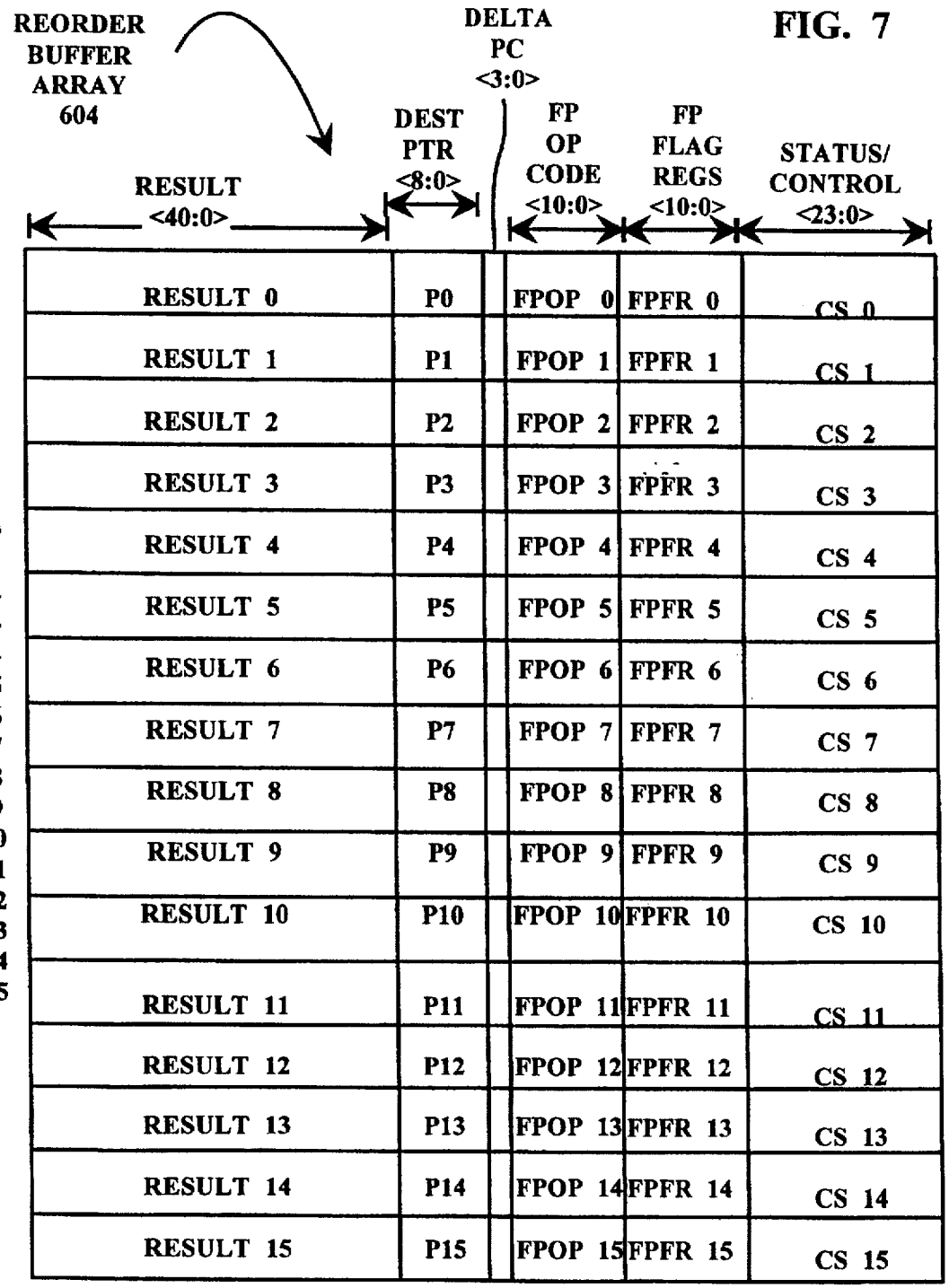
FIG. 7 is a pictorial illustration of a memory format within the reorder buffer of FIG. 6.

FIG. 7, in association with FIG. 6, depicts an example of a reorder buffer array 604 which includes sixteen entries, each of which includes a 41-bit result field, a 9-bit destination pointer field, a 4-bit lower program counter field, an 11-bit floating point operation code field, an 11-bit floating point flag register field and a 24-bit control and status field. A 41-bit result field is furnished to store results received from the functional units. Two reorder buffer entries are used to store a floating point result. Integer results are stored in 32 of the 41 bits and the remaining nine bits are used to hold status flags. The destination pointer field (DEST PTR<8:0>) of each ROB array 604 entry designates a destination register in register file 124. The floating point operation code field stores a subset of the bits of an x86 floating point operation code corresponding to the instruction allocated to a reorder buffer entry. The floating point flag register field stores the state of the floating point flags resulting from a floating point operation. Floating point flags store information relating to precision, underflow, overflow, zero divide, denormalized operand and invalid operand errors detected by floating point functional unit 172. For integer operands, a corresponding flag field is not necessary since flags resulting from integer operations are held in the upper order bits of the 41-bit result field. Control and status field includes bits which denote the status of the ROB entry, for example, an ALLOCATE bit, a BRANCH TAKEN bit, a MISPREDICT bit, a VALID bit, an EXIT bit, an UPDATE EIP bit and an EXCEPTION bit. The ALLOCATE bit designates whether a reorder buffer entry is allocated. The MISPREDICT bit indicates that a branch is incorrectly predicted. The EXCEPTION bit signals that execution of an instruction has caused an exception or error condition. The VALID bit indicates that a result is valid and the instruction is complete. The control and status field also includes bits that are used to generate the execute program counter value. These bits include a DECODE PC CARRY bit and an EXIT bit. The DECODE PC CARRY bit is the carry bit from the decode PC block 382. The EXIT bit specifies that a ROP is the last ROP in the sequence of ROPs of a particular x86 instruction and is used to trigger updating of an EIP register 620. EIP register 620 is only updated when the ROP sequence for a particular x86 instruction completes.

Reorder buffer 126 holds address values in a compact form for updating EIP register 620. Only the four least significant bits (LSB) and a bit increment indication are saved. For sequential x86 bytes, the number of bytes added can be no more than 15, and for non-sequential fetches, the successful completion of a branch drives the new branch target PC onto a result bus 132. It follows that writing of fetch PC from instruction decoder 118 to reorder buffer 126 for EIP register 620 updating is not necessary. This is done using EIP generator circuit 630 which includes a low-order EIP generator circuit 632, a high-order EIP generator circuit 634 and a EIP control circuit 636.

Low-order EIP generator circuit 632 includes an entry multiplexer 640, a branch multiplexer 642 and an LSB EIP register 622 which holds the four LSBs of EIP register 620. Entry multiplexer 640 receives the four address LSBs corresponding to the decode PCs of the four reorder buffer 126 entries at the head 616 of ROB array 604. These 4-bit fields are allocated and set at dispatch of the ROPs and are stored in the lower program counter fields of the four entries of ROB array 604. Entry multiplexer 640 selects one of the four lower program counter fields. Branch multiplexer 642 receives the four address LSBs corresponding to the target PCs of the four reorder buffer 126 entries at the head 616 of ROB array 604. These 4-bit fields are defined only for branch instruction ROPs and are stored in the result fields of the four entries of ROB array 604. In addition to the four target PC fields, branch multiplexer 642 also receives the lower program counter field which is selected by entry multiplexer 640. EIP control circuit 636 applies control signals to entry multiplexer 640 and branch multiplexer 642 to select the 4-bit lower-order branch target which designates the next instruction to be executed. This lower-order branch target is communicated from branch multiplexer 642 to LSB EIP register 622 and is the 4-bit LSB of the next EIP register 620.

High-order EIP generator circuit 634 includes an entry multiplexer 650, a branch multiplexer 652, a generate upper increment circuit 654, an adder circuit 656 and an HSB EIP register 624 which holds the most significant 28 bits (MSB) of EIP register 620. Entry multiplexer 650 receives the 28 address MSBs corresponding to target PCs of the four reorder buffer 126 entries at the head 616 of ROB array 604. These 28-bit fields are defined only for branch instruction ROPs and are stored in result fields of the four entries of ROB array 604. Entry multiplexer 650 selects one of the four 28-bit HSB target Pcs. Branch multiplexer 642 receives the 28-bit MSB target PC which is selected by entry multiplexer 650 and also receives the 28 MSBs held in MSB EIP register 624. Branch multiplexer 652 selects between the MSB target PC and the HSB EIP, under control of EIP control circuit 636, to generate a 28-bit upper branch target value of the next branch target value, which is called a multiplexed preliminary EIP. Generate upper increment circuit 654 of high-order EIP generator circuit 634 furnishes an increment signal, which is set by instruction decoder 118 at instruction dispatch and is applied to adder circuit 656 along with the multiplexed preliminary EIP from branch multiplexer 652. Adder circuit 656 increments the multiplexed preliminary EIP by the increment signal to supply a high-order EIP address, which is written to the MSB EIP register 624 to generate a clocked higher significant 28-bit EIP address. EIP control circuit 636 applies control signals to entry multiplexer 650 and branch multiplexer 652 to select the 28 MSB branch target which designates the next instruction to be executed. This higher-order branch target is communicated from branch multiplexer 652 to MSB EIP register 624 and is the 28-bit HSB of the next EIP register 620.

EIP control circuit 636 sets EIP register 620 on the basis of control information held in various bit fields of the four ROB entries at the queue head 616. This information includes the BRANCH TAKEN bit, the UPDATE EIP bit, the EXIT bit and the VALID bit. The EIP control circuit 636 controls low and high-order EIP generator circuits 630 and 632 entry multiplexers 640 and 650, branch multiplexers 642 and 652 and registers 622 and 624, respectively. The UPDATE EIP signal activates the EIP generator circuit 630 to determine a new address. The VALID bit indicates that an ROP has completed execution. The EXIT bit specifies that a ROP is the last ROP in the sequence of ROPs of a particular x86 instruction. The EXIT bit triggers updating of the EIP register 620. EIP control circuit 636 controls the multiplexers to select MSB and LSB pairs of only an ROB entry which has a set VALID bit and for which all ROB entries between the entry and the head entry have set VALID bits. The VALID bit determines whether a result of an ROP is to be retired. The entry multiplexer 640 selects one of the four lower program counter fields. The selected lower program counter field corresponds to the ROP to be retired of the four ROPs, which is farthest from the queue head 616 so long as all intervening ROPS, including the ROP at the queue head 616 are also to be retired. The BRANCH TAKEN bit specifies that the EIP register 620 is to be updated on the basis of branch when the BRANCH TAKEN bit is set. If one of the four reorder buffer 126 entries corresponds to a branch instruction ROP which is specified to be retired by EXIT and VALID bits, and its BRANCH TAKEN bit is set, the EIP control circuit 636 selects the target PC of the branch to set EIP register 620.

ROB control and status block 600 controls retiring of result operands stored in ROB array 604. When a result in ROB array 604 is no longer speculative, ROB control and status block 600 concurrently tests the ALLOCATE bits, VALID bits and EXCEPTION bits of the four reorder buffer entries nearest the queue head 616. In addition, ROB control and status block 600 tests the four entries to detect taken branches, stores and load misses. ROB control and status block 600 determines which of the allocated ROP entries have valid results. A result of the four tested ROPs is retired so long as the VALID bits of all ROPs from the queue head 616 to the ROP having a result to be retired are asserted. ROB control and status 600 retires an ROP, communicating the result to register file 124, by placing the result field of an ROB array 604 element on one of the writeback busses 134 and driving the write pointer 133 corresponding to the writeback bus with the destination pointer. Write pointer 133 designates the register address within register file 124 to receive the retired result. For write-back of integer data, low order bits <31:0> of the result hold integer data, while high order bits <37:32> are flags EFLAGS 145 which update the status flags register 125. For floating point data, separate FP flag busses 138 communicate flags to reorder buffer 126, where the flags are stored until they are conveyed to a floating point status register (not shown) when the floating point ROP is retired.

The queue tail 618 points to the reorder buffer entry to be allocated to the next dispatched ROP. The queue head 616 identifies the next result to retire. The relative position of entries in the ROB array 604 corresponds to the order of speculative program execution. To access a particular register that has entries corresponding its renamed versions in reorder buffer 126, the latest version is determined by the relative position of the most recently allocated corresponding renamed register in the ROB array 604. Reorder buffer 126 can update multiple renamed versions of any register in register file 124 up to the total number of reorder buffer entries (sixteen in this particular embodiment).

Reorder buffer 126 also handles exceptions and traps that occur during speculative ROP execution. When a functional unit detects an exception or trap as it executes an ROP, it sends a flag indicating the event on the status bus 141. The flag is held in the entry of reorder buffer 126 allocated to the ROP; specifically, in the control status field. When an attempt is made to retire this result, notice of the exception is communicated from reorder buffer 126 to the functional units over exception line 160. The functional units respond to the exception by flushing their reservation stations. All speculative reorder buffer entries are invalid. For some instructions, the reorder buffer entry corresponding to the exception or trap is retired before clearing the speculative state, for other instructions the entry is cleared and not retired. The speculative state is cleared in one clock cycle by setting the head 616 and the tail 618 pointer to zero. This frees reorder buffer 126 to allocate entries to ROPs in the correct sequence that is fetched after the exception or trap is taken.

In addition, reorder buffer 126 handles data resulting from speculative ROP execution. For taken branches, reorder buffer 126 entry allocated to the branch ROP holds the target PC of the branch. For mispredicted branches, the reorder buffer 126 sets CANCEL bits to invalidate speculative ROPs beyond the branch, including all reorder buffer 126 entries from the mispredicted branch to the queue tail 618. Reorder buffer 126 records this invalidity by setting a CANCEL bit in the ROB array 604 status and control field <23:0> for each of the invalid entries. When the invalid entries are retired, their results are discarded and processor resources, such as register file 124, are not updated. When a reorder buffer entry having an asserted CANCEL bit is retired, writing of the result to register file 124 and updating of the EIP register 620 are inhibited. However, the queue head 616 is incremented as is standard when CANCEL bits are not asserted so that the reorder buffer entry is deallocated and made available for new ROPs. The reservation stations of the functional units are not flushed.

Reorder buffer 126 not only manages registers, but also handles status flags, as renamable resources. Designated bits and bit fields within status flags 125 are used to control various operations and to indicate the status of processor 110. Status flags 125 includes a carry flag CF (bit 0), a parity flag PF (bit 2), an auxiliary carry flag AF (bit 4), a zero flag ZF (bit 6), a sign flag SF (bit 7), a trap flag TF (bit 8), an interrupt enable flag IF (bit 9), a direction flag DF (bit 10), an overflow flag OF (bit 11) and a resume flag RF (bit 16). Of these flags, six primary status flags (OF, SF, ZF, AF, PF and CF) are updated as a consequence of most integer operations and are used to generate the conditions for conditional branch instructions. Conditional branch instructions are often in the form Jcc, or jump on condition code cc. Here, cc represents flags or condition codes. For example, branch instruction JNZ means jump to a predetermined address if the zero flag (ZF) is zero.

In a superscalar processor 110, some dispatched ROPs have not completed execution, others have completed execution but are in a speculative state, still others have become nonspeculative. Reorder buffer 126 handles result data for unexecuted and speculative ROPs. Register file 124 holds retired result data for nonspeculative ROPs. Just as some instructions produce result data, various instructions produce flags, which have similar unavailable, speculative and nonspeculative states. Various registers, circuits and connections are provided for handling flags as described in detail in U.S. Pat. No. 5,632,023, issued May 20, 1997 (S. A. White, D. S. Christie and M. D. Goddard, "Superscalar Microprocessor including Flag Operand Renaming and Forwarding Apparatus"), which is incorporated herein by reference in its entirety. Status flags 125 serves to hold flags that have become nonspeculative. Reorder buffer 126 includes circuits for handling the speculative states of flags.

The six status bits or flags OF, SF, ZF, AF, PF and CF of status flags 125 applied as renamable resources for usage of branch unit 170. Reorder buffer 126 includes the sixteen element reorder buffer array 604, each element of which includes the 41-bit result field and the 11-bit floating point flag register field. After floating point ROPs are executed, floating point results are written to the result field and floating point flags are written to the floating point flag register field of the reorder buffer array 604 entries. After integer ROPs that set flags are executed, integer results are written to bits <31:0> of the result field and integer flags are written to bits <37:32> of the result field of the reorder buffer array 604. In this manner, reorder buffer 126 accomplishes register renaming and flag renaming.

As reorder buffer 126 allocates entries and assigns operand tags, it also assigns tag values to flags that are affected by the ROPs. When instruction decoder 118 dispatches a subsequent ROP, such as a branch instruction ROP which requires those flag values as source flag operands, reorder buffer 126 sends the corresponding flag values if they are available or sends the corresponding flag tags via tag busses (not shown) to branch unit 170. Branch unit 170 holds the flag values or flag tags in branch reservation station 902 until the branch is ready for execution. If flag tags are sent to branch unit 170, branch reservation station (902 of FIG. 9) waits until flag values are forwarded on bits <37:32> of the four general purpose result busses 132 as a result of ROP execution by an integer functional unit, for example ALU0 or ALUL which executes the ROP that causes these flags to be updated.

The integer flag values on the result busses are also written to reorder buffer array 604. At result retirement, when flag values associated with an ROP are no longer speculative, flags corresponding to the retired ROP are similarly retired from reorder buffer array 604 to status flags 125.

If a branch ROP requiring one or more flag operands is dispatched by instruction decoder 118 to branch unit 170 and there is no flag entry or flag tag in reorder buffer array 604 corresponding to the required operand flags, then the required flag operands are retrieved from status flags 125 and sent to branch unit 170 by the flag operand bus (not shown).

Dependency checking of result data operands and flags is accomplished using a dependency checking circuit (not shown) within reorder buffer 126. A separate dependency checking circuit is furnished for each renamable resource in reorder buffer 126 so that all dependencies are tested simultaneously. Three flag groups are renamable resources so that three dependency logic circuits are employed for flag renaming. A suitable dependency checking circuit is described in detail in U.S. Pat. No. 5,689,693, issued Nov. 18, 1997 (Scott A. White, "A Range-Finding Circuit using Circular Carry Lookahead"), which is hereby incorporated by reference. Certain flags, particularly the SF, ZF, AF and PF bits, are interdependent, so that ROPs that evaluate one of the bits also evaluates all of the others. These interdependent flags are grouped as a single renamable resource so that only a single dependency circuit is furnished.

Renaming of flags permits conditional branches to execute as soon as the flag operands are available, thereby improving performance of the superscalar processor 110. Specifically, branch instruction ROPs are dispatched to the branch unit 170 and updates to the flags are scheduled before other functional units, such as ALU 175, have determined values of condition flags upon which the conditional branch depends. One problem that arises is that certain instructions performed by ALU 175, including left and right rotate and shift operations, employ a rotate or shift count that is variable and dependent upon the results of other instructions. The shift or rotate count may turn out to be zero, which is not determinable at dispatch of the subsequent branch instruction ROP. For a shift or rotate count of zero, an x86 instruction suppresses flag updating, so that the flags remain unchanged after the cancelled update. Although ALU 175 furnishes flags as an output operand, it does not receive them as an input parameter so that, upon a cancelled flag update, the ALU cannot supply the next most recent flag value. Branch unit 170 cannot detect that updating of the carry flag has been cancelled. Furthermore, branch unit 170 cannot be directed to cancel the forwarding of erroneous flag operands following a cancelled shift operation since there is no pointer that designates the most recent valid renamed copy of the flags.

Processor 110 handles a cancelled flag update by invoking a resynchronization response. When flag updating is cancelled, ALU 175 asserts an update cancelled code on status bus 141. The update cancelled code is held in the entry of reorder buffer 126 allocated to the ROP; specifically, in the status/control <23:0> field. When the cancelled shift or rotate ROP is retired, reorder buffer 126 acknowledges cancellation of the instruction so that writing of the flags to the status flags 125 is cancelled. Reorder buffer 126 further acknowledges the cancelled shift or rotate instruction by invoking a resynchronization response. A resynchronization request resulting from the cancelled flag condition is communicated from reorder buffer 126 to the functional units over exception line 160 and a resynchronization response is initiated which resynchronizes all processor 110 operations. Because resynchronization is invoked only when the shift-by-zero ROP is retired, resynchronization is avoided if the shift-by-zero arises from a mispredicted branch, or an interrupt or exception occurs before the shift ROP is retired.

Resynchronization cancels speculative ROPs, including any branch instruction ROP entries that are dependent on the cancelled shift instruction. Following resynchronization, execution begins with the ROP following the cancelled shift ROP. All speculative flag values are flushed. Any branch instruction ROP having a dependency on the cancelled shift operation appropriately executes using the nonspeculative flag operand from status flags 125.

Figure 8:
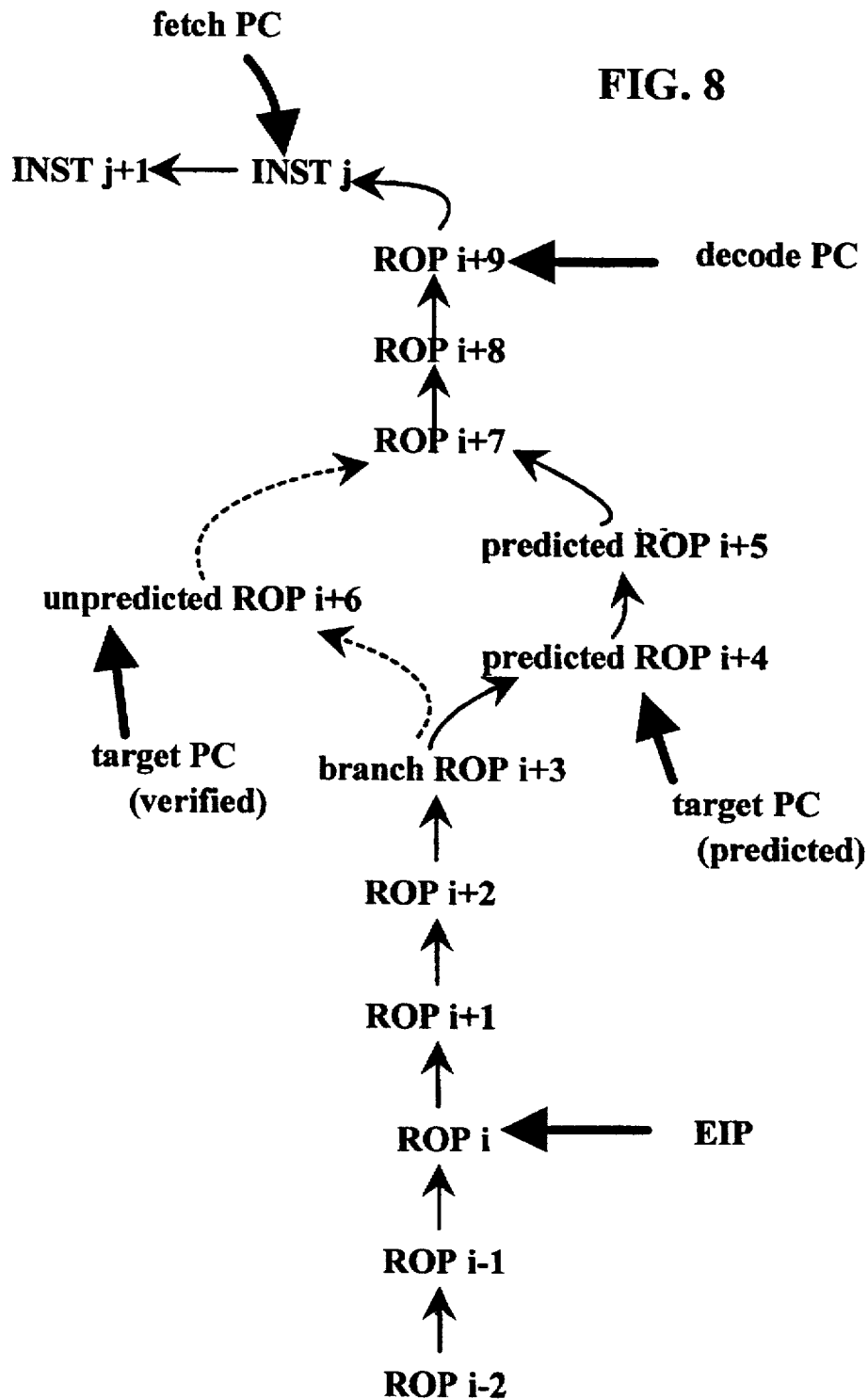
FIG. 8 is a pictorial illustration that describes the interactions of program counters within the processor of FIG. 1.

FIG. 8 illustrates a sequence of program instructions in an instruction pipeline and various instruction pointers to instructions in the pipeline. The depicted sequence of instructions includes a branch instruction. Instructions (INST j and INST j+1) are decoded into ROPs (ROP i+9), dispatched, executed and retired (ROP i). ROPs i+1 through i+9 are speculative ROPS. ROPs i−1 and i−2 are retired and no longer in the operational pipeline.

Referring to FIG. 8, with reference to FIGS. 1, 2, 3, 6 and 9, a processor uses a program counter or instruction pointer to designate the instructions to be executed. Since a superscalar processor executes multiple instructions in multiple stages in parallel, several program counters are useful for different purposes. The processor 110 includes four program counters that serve various functions including a fetch program counter (fetch PC) 210, a decode program counter 382 (decode PC), a target program counter 122 (target PC) and an extended instruction pointer 620 (EIP).

The fetch PC 210 is maintained at the beginning of the pipeline to designate an address within the instruction store array 250 of instruction cache 116 at which an instruction or group of instructions is fetched. Fetch PC points to instructions (INST j) entering the pipeline. As instructions are converted to ROPs that propagate along the pipeline stages, subsequent instructions (INST J+1) are fetched and placed in the pipeline. Thus, fetch PC designates only instructions that are in the first stage of processing, the fetch stage. Most problems that stop execution of an instruction stream are detected in latter stages of the pipeline. Fetch PC 210 is located within instruction cache 116 and identifies x86 instructions to be fetched during sequential and nonsequential accesses of instruction cache 116 and external memory 114. Fetch PC 210 is useful for recovering an appropriate instruction address following a cache miss. Instruction cache 116 updates fetch PC 210 from one cycle to the next, either by maintaining the same address, incrementing the address to the next cache entry, receiving an address via the internal address/data bus 111 or loading the address from a target pc bus 122.

Instruction decoder 118 includes the decode PC block 382 which tracks logical instruction addresses of each x86 instruction sent from byte queue 135. Instruction cache 116 accesses instructions on the basis of linear addressing. Fetch PC identifies these linear addresses, depicted as addresses j and j+1. However, the EIP register 620 in reorder buffer 126 maintains logical x86 addresses, shown as ROP addresses i-2 through i+9. Instruction decoder 118 converts the linear addresses of fetch PC into logical addresses for updating the EIP register 620. Instruction cache 116 assists this conversion by subtracting a segment base pointer from the linear address to derive the logical address. This 32-bit logical address is driven to decode PC block 382 of instruction decoder 118 which generates the decode PC and designates logical ROP addresses.

When byte queue 135 detects a nonsequential fetch, it designates the program counter that results from the taken branch and pointer to a particular byte within this program counter and sends this information to decode PC block 382. Decode PC block 382 generates a decode PC value for each ROP furnished by instruction cache 116. Decode PC shown in FIG. 8 designates ROP i+9. Instruction decoder 118 derives the decode PC by incrementing bytes off the current decode PC as instruction bytes are dispatched, and loading the new branch PC when the first byte of the branch instruction is loaded into instruction decoder 118 from byte queue 135. For sequential instructions that follow branches, decode PC block 382 counts the number of x86 bytes in byte queue 135 between the start and end positions of the unbroken sequence and adds this number to the current decode PC to determine the next decode PC following the sequence. The instruction decoder 118, as it dispatches a branch instruction ROP to the branch unit 170, sends the decode PC via decode pc busses 213.

Decode PC is conveyed to branch unit 170 over DPC bus 213. Branch unit 170 uses the conveyed decode PC as a base address for calculating of the target PC and for comparing the updated target PC to a predicted target PC to determine whether a branch is correctly predicted.

Branch unit 170 generates a third program counter, the target PC, which furnishes redirection of instruction fetching following misprediction of conditional branch instructions. Branch unit 170 derives the target PC as directed by the ROP, based on the address of the branch instruction (e.g. ROP i+3) and the offset (e.g. +1). Branch unit 170 modifies the target PC according to the specifications of the branch instruction ROP and its operands, using the adder 910 or the incrementer 912, as shown in FIG. 9. For example, the adder 910 is used to calculate a new target PC (e.g ROP i+4) from the decode PC value of the branch instruction ROP (e.g. ROP i+3) and an offset parameter (+1) supplied as an operand via the operand busses 130 and 131. If a match occurs between the updated target PC (ROP i+4) and the target PC that is calculated using information supplied by the instruction decoder 118, the branch unit 170 drives the result on result busses 132 to reorder buffer 126. The result includes the target PC (ROP i+4) and a status code indicating a match. If the branch is mispredicted, the correct target PC (ROP i+6) is driven to the instruction cache 116, redirecting the fetch address. Branch unit 170 redirects the instruction cache 116 by passing the redirection target PC back to the instruction cache 116 on the target pc bus 122. Target PC indicates the address at which fetching should now begin. Fetch PC 210 directs the instruction stream to the target pc address and begins refilling the byte queue 135.

The EIP register 620 in reorder buffer 126 serves as the fourth program counter, which tracks addresses of executed instructions and designates the next instruction to complete execution and have its result retired (e.g. ROP i). When result retirement occurs, EIP is advanced forward to reflect the address of the instruction immediately after the last of the instructions that have retired results. Thus, EIP register 620 implicitly serves as a pointer which distinguishes ROPs which have generated nonspeculative data from speculatively executing ROPs. The EIP register 620 pointer is controlled implicitly by interrupts, exceptions and control-transfer instructions including jumps, returns and calls. The EIP register 620 is advanced from one instruction boundary to the next. Because of instruction prefetching, it is only an approximate indication of the bus activity which loads instructions into the processor.

EIP register 620 is useful for identifying the address of instructions that encounter a problem, such as an exception or trap, which halts execution of the instruction stream. The EIP is therefore useful for continuing execution of the instruction stream after corrective action is taken or for debugging.

The branch unit 170 shown in FIG. 9 controls fetching of instructions that do not follow a sequential program order, including jump and call operations and return microroutines. Branch unit 170 verifies branch predictions and generates misprediction signals. Branch unit 170 includes a branch reservation station 902 which is connected to an adder 910 and an incrementer 912, branch predict compare logic 908 and a branch remap array 904. The branch remap array 904 is a part of the floating point stack. The branch unit 170 further includes a branch predict taken FIFO 906 that tracks branches that are "predicted taken". Branch predict taken FIFO 906 holds the PC of the predicted taken branch and applies this PC to the branch predict compare logic 906. The adder 910 and incrementer 912 calculate target addresses for branches relative to the address of the branch instruction ROP. When a nonsequential fetch is predicted by the instruction cache 116, its nonsequential address (the result of the branch operation) is driven to the branch predicted taken FIFO 906 and latched, along with the PC of the branch.

When the corresponding branch is later decoded and issued, the branch unit 170 executes the branch ROP by deriving a target PC based on the address of the branch instruction as directed by the ROP, using the adder 910 or the incrementer 912. For example, the adder 910 is used to calculate a new target PC from the decode PC value of the branch instruction ROP and an offset parameter supplied as an operand via the operand busses 130 and 131. If a match occurs between the updated target PC and the decode PC which is supplied from the instruction decoder 118, the branch unit 170 drives the result on result busses 132 to reorder buffer 126. The result includes the target PC and a status code indicating a match. If a branch is mispredicted, branch unit 170 drives the correct target PC to instruction cache 116 via target pc bus 122 and to reorder buffer 126 via result busses 132. The target PC is driven to instruction cache 116 to immediately begin fetching instructions in a corrected path. The target PC is driven to reorder buffer 126 to cancel the succeeding ROPs contained in the mispredicted branch. In this manner, execution can be restarted at the correct target PC and corruption of the execution process is thus prevented.

The branch reservation station 902 is a multiple element FIFO array which receives ROP opcodes from instruction decoder 118 via the opcode/type busses 150 and operand and result data from register file 124 and reorder buffer 126 via the A and B-operand busses 130 and 131 and from the result busses 132. Each reservation station element stores opcode information for one branch instruction ROP. Multiple branch instruction ROPs may be held within its queue. Information received by branch reservation station 902 includes the decode PC, a branch prediction and a branch offset. The decode PC is communicated over the decode PC bus 213. The branch prediction is carried over branch prediction lines. The offset is communicated via the A and B-operand busses 130 and 131 through reorder buffer 126 to the branch unit 170.

When instruction decoder 118 dispatches a branch instruction ROP to branch unit 170, it communicates the lookahead TOS 302 and the lookahead full/empty array 306, which are stored in the branch reservation station 902. The lookahead TOS may be implemented within a functional block other than the instruction decoder 118. Preferably the lookahead remap array 304, the lookahead full/empty array 306 and lookahead TOS 302 are available for handling by branch unit 170 so that the processor functions in one manner when a prediction is correct and functions differently for a misprediction.

When a predicted branch instruction ROP is decoded and issued, the decode PC, offset and prediction are dispatched and held in the branch unit 170 reservation station 902. If the predicted target PC matches the decode PC, a branch is predicted correctly and result information reflecting a correct prediction is returned correctly to reorder buffer 126. This information includes a target PC and a status code that indicates a match was achieved. If a branch is mispredicted, the branch unit 170 drives the correct target PC both to the instruction cache 116 and to reorder buffer 126 and communicates an instruction block index to the instruction cache 116. The index represents prediction information that is used to update the branch predicted taken FIFO 906. Reorder buffer 126 responds to a mispredicted branch by cancelling succeeding ROP operations.

Branch unit 170 also converts logical addresses from instruction decoder 118 into linear addresses in cases of a misprediction. To do this, local copies of a code segment base pointer are supplied to branch unit 170 by code segment block 216 of instruction cache 116.

Branch unit 170 manages speculative updates of floating point stack blocks, including floating point TOS 472, floating point remap array 474 and floating point full/empty array 476 to implement floating point exchange instructions (FXCH) and accelerate floating point operations. Branch unit 170 achieves these objectives by preserving copies of the current stack status whenever a speculative branch occurs. Branch remap array 904 is copied from the lookahead remap array 304 (see FIG. 3) that is dispatched with each FXCH instruction. Branch remap array 904 is not absolutely necessary since it stores the same information as lookahead remap array 304. However, it is desirable to dispatch lookahead remap array 304 only when necessary, rather than for each branch instruction ROP. Because lookahead remap array 304 only changes in response to FXCH instructions, it is sent to branch unit 170 for FXCH requests alone.

Branch unit 170 responds to a misprediction by storing a correct copy of the stack pointer, the remap array and the full/empty array to the status that existed after the last successful branch. At completion of a branch ROP, branch unit 170 drives a branch tag 900 onto one of result busses 132 to communicate the branch prediction result. Branch tag 900 is the destination tag that corresponds to and identifies the reorder buffer entry holding the ROP of the branch instruction. Reorder buffer 126 receives a branch tag 900 and the tail 618 which bound all dispatched ROPs subsequent, in program order, to the mispredicted branch instruction ROP.

When the branch is predicted correctly, floating point TOS 472, floating point remap array 474 and floating point full/empty array 476 are saved without modification.

When a branch is mispredicted, branch remap array 904 and the top-of-stack pointer and full/empty array stored in reservation station 902 for the mispredicted branch describe the state of the stack prior to the mispredicted branch. Branch unit 170 writes the locally stored remap and TOS values to lookahead remap array 304 and lookahead TOS 302 within instruction decoder 118 to return the state of the stack to that in effect preceding the mispredicted branch. It is preferable for the branch functional unit, rather than another unit, to test and recover the stack because the branch unit 170 alone detects mispredictions.

When a functional unit in processor 110 detects an exception condition, it returns a code to reorder buffer 126. Reorder buffer 126 achieves recovery by flushing its entries so that execution is resumed in a known state. Reorder buffer control block 670 executes a similar recovery operation for the stack. Upon an exception, reorder buffer 126 writes floating point remap array 474 to lookahead remap array 304, floating point TOS 27 to lookahead TOS 302, and floating point full/empty array 476 to lookahead full/empty array 306.

Processor 110 is able to execute floating point exchanges in parallel with floating point arithmetic instructions because the floating point stack is implemented outside of the FPU. For this reason, floating point stack component blocks are incorporated into units other than the floating point unit. Thus, lookahead remap array 304 and lookahead TOS 302 are incorporated into instruction decoder 118. Floating point TOS 472, floating point remap array 474 and floating point stack array 500 are placed within reorder buffer 126. Branch unit 170 furnishes the branch remap array 904. Likewise, the FXCH instruction is executed within the branch unit 170 rather than a floating point unit to promote parallel instruction processing.

When a floating point exchange instruction executes normally with no branch mispredictions, exceptions, interrupts or traps, branch unit 170 stores the lookahead remap array 304 value sent by instruction decoder 118. Upon completion of FXCH execution, branch unit 170 writes lookahead remap array 304 value to result busses 132. Reorder buffer 126 then commits to the exchange of registers by writing the lookahead remap array to floating point remap array 474 at retire time.

Branch unit 170 checks for stack errors prior to executing the FXCH instruction ROP. These errors include stack overflow and underflow conditions. Detection of stack underflow and overflow conditions is described in detail in U.S. Pat. No. 5,696,955, issued Dec. 9, 1997 (M. D. Goddard and S. A. White, "Floating Point Stack and Exchange Instruction"), which is incorporated herein by reference in its entirety. When a stack underflow error is detected, branch unit 170 returns an error notification code to reorder buffer 126 on status busses 141 which causes reorder buffer 126 to initiate a resynchronization response. This, in turn, restarts the processor at the FXCH instruction. However, the FXCH instruction that is invoked upon resynchronization following a stack underflow condition is different from other FXCH instructions. In particular, nonresynchronization FXCH instructions include a single FXCH ROP. The resynchronization FXCH instruction includes five ROPs, including two pairs of floating point add (FADD) ROPs and the single FXCH ROP. The two pairs of FADD ROPs respectively add zero to the two floating point registers that are exchanged in the FXCH instruction. A stack underflow error is caused by attempting to read an operand from an empty stack location. Floating point unit 172 determines whether the register is empty or full, in accordance with lookahead full/empty register 306. If an exchanged floating point register contains valid data, adding zero does not change the value of the data. Otherwise, when floating point unit 172 executes an FADD ROP and an exchanged floating point register is empty, floating point unit 172 responds either by initiating a trap response, if trapping is not masked, or by loading the register with a quiet not-a-number (QNaN) code.

Resynchronization following a stack underflow causes processor 110 to backtrack to the FXCH instruction, place the data in a known state, either valid data or a QNaN code, and to retry instructions following the FXCH, including any instructions that executed using invalid data.

Note, that every floating point instruction includes at least a pair of ROPs for the 41-bit operand busses 130 and 131 and the 41-bit result busses 132 to accommodate 82-bit floating point data.

Figure 10:
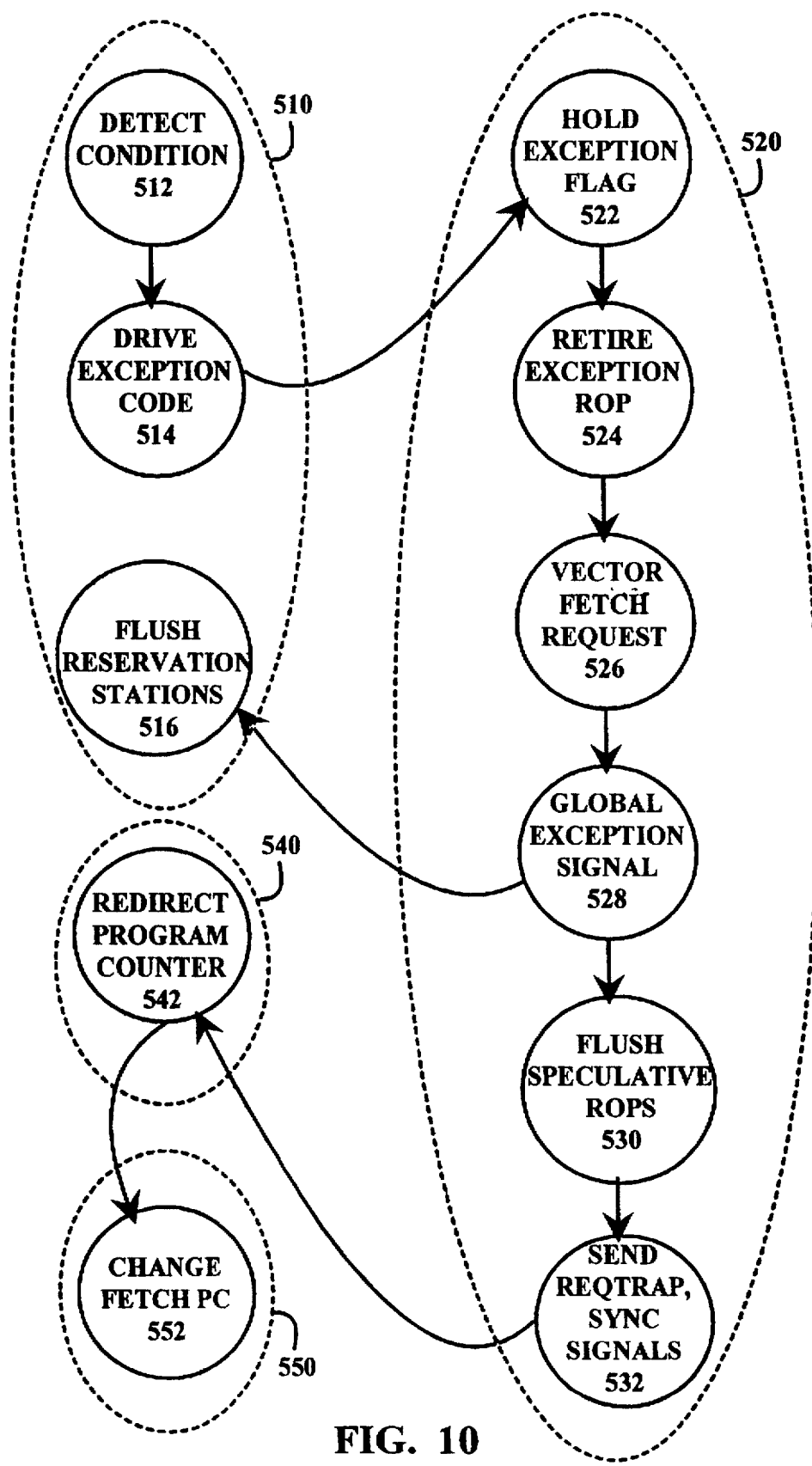
FIG. 10 is a flow chart of a method of resynchronizing the processor in response to various conditions, including exceptions and traps.

Functional units detect exceptions and traps while executing ROPs and respond by driving an EXCEPTION status code on status busses 141 to reorder buffer 126. FIG. 10 is a flow diagram showing a procedure for responding to exceptions and traps. This procedure includes the steps labelled 510 through 552, which include functional unit steps 510, reorder buffer steps 520, branch functional unit steps 540 and instruction cache steps 550. Functional units perform various resynchronization operations 510. Particular ones of the functional units detect resynchronization conditions 512 and, in response to such detections, drive EXCEPTION status code 514 to reorder buffer 126.

In operations 520, reorder buffer 126 controls the response of processor 110 to the exceptions and traps that occur during speculative ROP execution. The EXCEPTION code is held 522 in the entry of reorder buffer 126 associated with the ROP. When the ROP is retired 524, the EIP generator circuit 630 tests various status bits, including the EXCEPTION bit. If the EXCEPTION bit is asserted, a trap vector fetch request 526 is formed with the exception status information stored in the ROP entry. Notice of the exception is communicated from reorder buffer 126 to the functional units over exception line 160. Reorder buffer 126 relays the global EXCEPTION signal 528 to all of the functional units and other units including instruction decoder 118 and instruction cache 116. The functional units and other functional blocks of the processor then perform an "exception response" in which the reservation stations are flushed 516 and any other initialization-type procedures are undertaken. All speculative reorder buffer entries following the exception or trap are invalidated 530. The speculative state is cleared in one clock cycle by setting the head 616 pointer and the tail 618 pointer to zero. This frees reorder buffer 126 to allocate ROPs in the correct sequence that is fetched after the exception is taken.

Typically one cycle after reorder buffer 126 sends the EXCEPTION signal on exception line 160 essentially globally throughout the processor 110, reorder buffer 126 sends a REQTRAP signal 532 on reqtrap line 162 to branch unit 170 alone and the branch unit performs resynchronization operation 540. The REQTRAP signal requests an exception or trap response, or similarly a resynchronization response, while XRES4B<31:0> is driven from reorder buffer 126 to branch unit 170 to inform branch unit 170 of the fetch PC from which instructions are to be fetched following the exception. In case of an exception, XRES4B<31:0> is set in one of two ways. First, the functional unit which detects the exception may specify a microcode entry point for redirection of instruction fetching by instruction cache 116. The functional unit drives this microcode ROM entry point onto one of the result busses 132. Alternatively, for some exceptions the functional unit uses the result busses 132 to return a result to reorder buffer 126 so that the result busses 132 are unavailable for communicating the microcode entry point. Second, reorder buffer 126 generates the microcode ROM entry point locally. In either case, reorder buffer 126 drives the microcode ROM entry point onto XRES4B<31:0>.

Processor 110 begins executing at a microcode ROM entry point, or for a resynchronization, at an instruction PC. The SYNC signal is also sent from reorder buffer 126 to branch unit 170. SYNC is used to qualify REQTRAP—to identify the information on XRES4B<31:0>. For resynchronization upon a stack underflow, an EXCHANGE SYNC signal is also communicated from reorder buffer 126 to branch unit 170. Branch unit 170 invokes the resynchronization FXCH ROP sequence.

Branch unit 170 redirects 542 the instructions for execution by sending signals to instruction cache 116, which performs resynchronization operation 550. UPDFPC is set to redirect EIP register 620. FPCTYP is sent from branch unit 170 to instruction cache 116 to designate whether the processor 110 is to begin operating from the MROM or the instruction memory 112. Branch unit 170 drives XTARGET to instruction cache 116 to provide a pointer for the cache to set fetch PC and begin fetching instructions at the redirected address 552.

Figure 11:
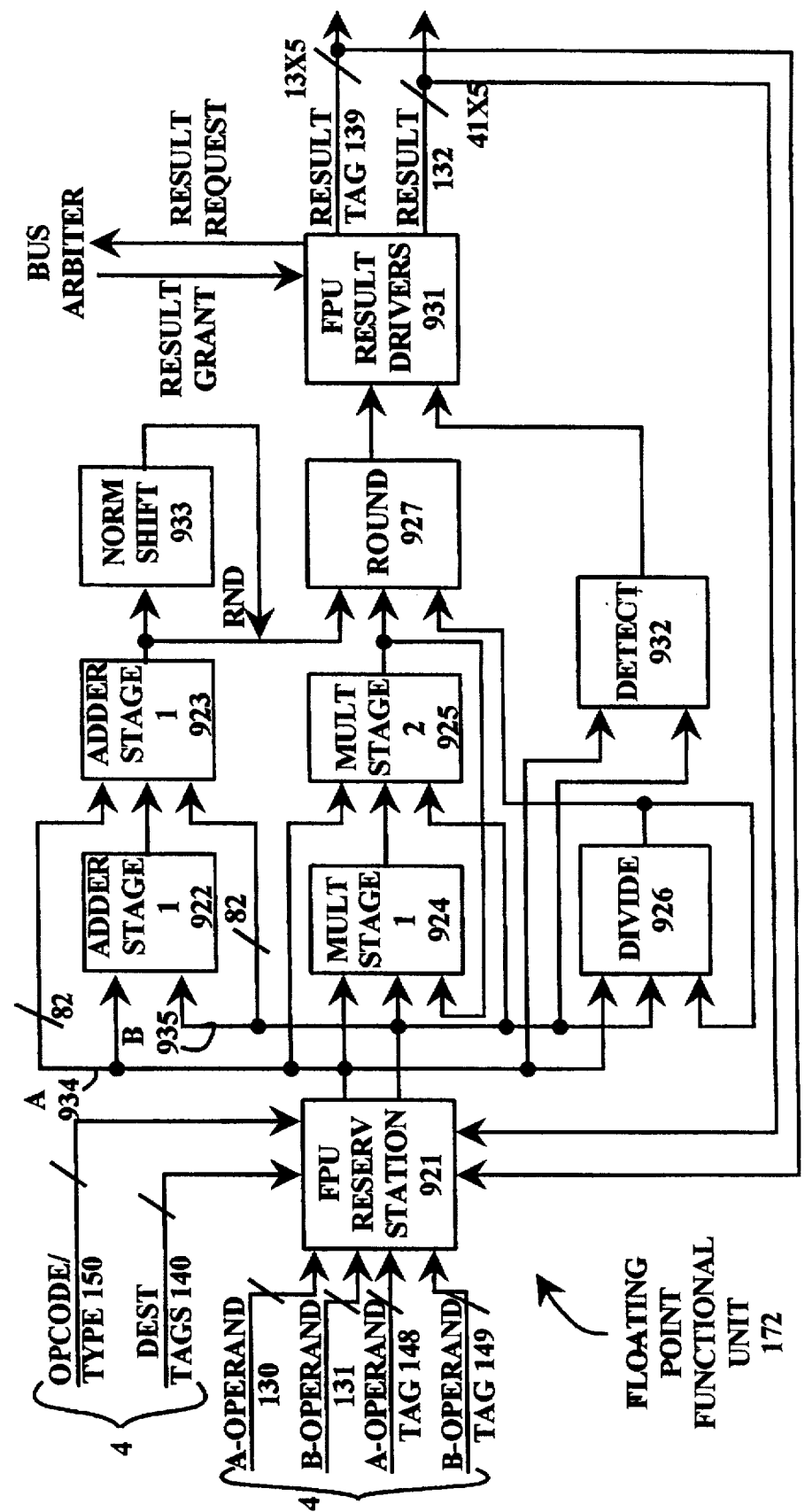
FIG. 11 is a block diagram of a floating point functional unit which includes features for implementing processor resynchronization.

FIG. 11 depicts a schematic block diagram of the floating point unit 172, which performs arithmetic calculations using three pipelines. A first pipeline is an addition/subtraction pipeline that includes two adder stages 922 and 923 and a normalizing shifter stage 933. A second pipeline is a multiplication pipeline having two multiplication stages 924 and 925. A third pipeline is a division/square root pipeline with a single divide stage 926. The floating point functional unit 172 also includes a shared floating point rounder 927, a detect block 932 and FPU result drivers 931. A floating point reservation station 921 is connected to receive inputs from opcode/type busses 150, A and B-operand busses 130 and 131, result busses 132, result tag busses 139, A and B-operand tag busses 148 and 149 and destination tag busses 140. The reservation station 921 holds two entries, each of which includes storage for an 82-bit A operand and an 82-bit B operand, a destination result tag, an 8-bit opcode for exception handling, a 4-bit A operand tag, a 4-bit B operand tag and status bits for indicating stack overflow and underflow conditions of the floating point stack. Note that the floating point stack does not reside within and, in general, is structurally isolated from the floating point functional unit 172. The reservation station 921 can accept one floating point operation, in the form of two ROPs, per clock cycle. Reservation station 921 drives 85-bit floating point A and B operand busses 934 and 935, each including 82-bit operands and three floating point calculation control bits.

The detect block 932 generates an EXCEPTION status code when inputs to the floating point unit 172 meet certain conditions of defined invalidity. Invalid conditions occur when floating point stack overflow or underflow signals are set, the denominator operand in a division operation is equal to zero, or the values of source operands have values such that the generated result of an instruction is forced to zero or infinity. When an exception is generated due to the inputs to the floating point functional unit 172, the unit cancels remaining stages of the operation and places an EXCEPTION status code on the status busses 141 so that reorder buffer 126 initiates an exception response throughout the processor 110.

The floating point rounder 927 detects exceptions that result from execution of floating point ROPs. These exceptions include overflow or underflow of the floating point exponent value, or an inexact error during rounding. These errors are signalled to the reservation station 921.

Reorder buffer 126 manages access to all data resulting from speculative ROPS. Functional units, such as floating point unit 172, do not perform such data management tasks. A functional unit executes arithmetic operations on data supplied by reorder buffer 126 on operand busses 130 and 131. Reorder buffer 126 controls the management of data so that all speculative data, including data in the floating point stack, is handled in a consistent manner through cooperation between various blocks in the processor 110, but generally independently of operations of the floating point functional unit 172.

By providing data flow control, including dependency resolution, in reorder buffer 126 alone, other processor blocks including the FPU 172 are simplified. Control information that is used by the floating point unit 172 is limited to stack status bits, such as bits that indicate stack overflow or underflow conditions. This information is generated by the instruction decoder 118 and passed to floating point unit 172 upon operation dispatch. When FPU 172 receives an overflow or underflow trap, it generates an EXCEPTION status code.

Floating point functional unit 172 detects two conditions for which processor 110 invokes a resynchronization response. A first resynchronization condition is the occurrence of a floating point exception with the NE (numeric error) bit (bit 5) of the CR0 control register set to zero and the $\overline{\text{IGGNE}}$ pin set to zero. A second resynchronization condition occurs for an early floating point exit.

The NE bit of the CR0 control register controls processor 110 exception handling. Specifically, depending on the value of the NE bit of the CR0 control register, the exception handler is invoked either (NE=1) through interrupt vector 16 or (NE=0) through an external interrupt. The NE bit enables a standard procedure for reporting floating-point numeric errors when it is set. When NE is clear and the $\overline{\text{IGNNE}}$ input is active (low), numeric errors are ignored. When the NE bit is clear and the $\overline{\text{IGNNE}}$ input is inactive (high), a numeric error causes the processor to stop and wait for an interrupt. This interrupt is generated by using the $\overline{\text{FERR}}$ pin to drive an input to the interrupt controller. The NE bit, $\overline{\text{IGNNE}}$ pin, and $\overline{\text{FERR}}$ pin are used to specify the response of processor 110 to a floating point error. Resynchronization is used to permit the processor 110 to ignore the error. The NE bit, $\overline{\text{IGNNE}}$ pin, and $\overline{\text{FERR}}$ pin are used with external logic to implement PC-style error reporting. CR0 control register and $\overline{\text{IGNNE}}$ and $\overline{\text{FERR}}$ pins are set forth in more detail in Appendix E of a publication of the Intel Corporation entitled "Intel486™ Microprocessor Family: Programmer's Reference Manual, Santa Clara, Calif., 1992, which is incorporated herein by reference in its entirety.

The second resynchronization condition occurs for an early floating point exit. An x86 floating point instruction may be executed in the form of a sequence of multiple floating point ROPs. Under various conditions, such as floating point error conditions, a floating point ROP may produce a result or condition in which it is no longer meaningful or desirable to execute subsequent floating point ROPs. These ROPs may be considered moot with regard to instruction stream. For example, the detect block 932 detects the invalidity conditions including invalid operation (such as FP stack underflow or overflow), division by zero, and results which would be forced to zero, infinity on the basis of the source operands. A divide by zero condition may indicate that subsequent floating point ROPs produce only overflow errors. In such conditions, it is efficient to produce a floating point result, including flags, on the basis of the initial meaningful ROPs and to cancel the subsequent irrelevant ROPS. In an early floating point exit response, input exceptions cause cancellation of the remaining stages of the operations (additional ROPs) and send a designation code on the result busses with an early floating point exit status indication.

Generally, the ROP that detects the exit condition and sends the condition code to reorder buffer 126, initiates a resynchronization response which flushes reorder buffer 126 and functional unit reservation stations and redirects fetch PC beyond the sequence of floating point ROPS. Resynchronized operation begins following the final floating point ROP in the sequence.

Figure 12:
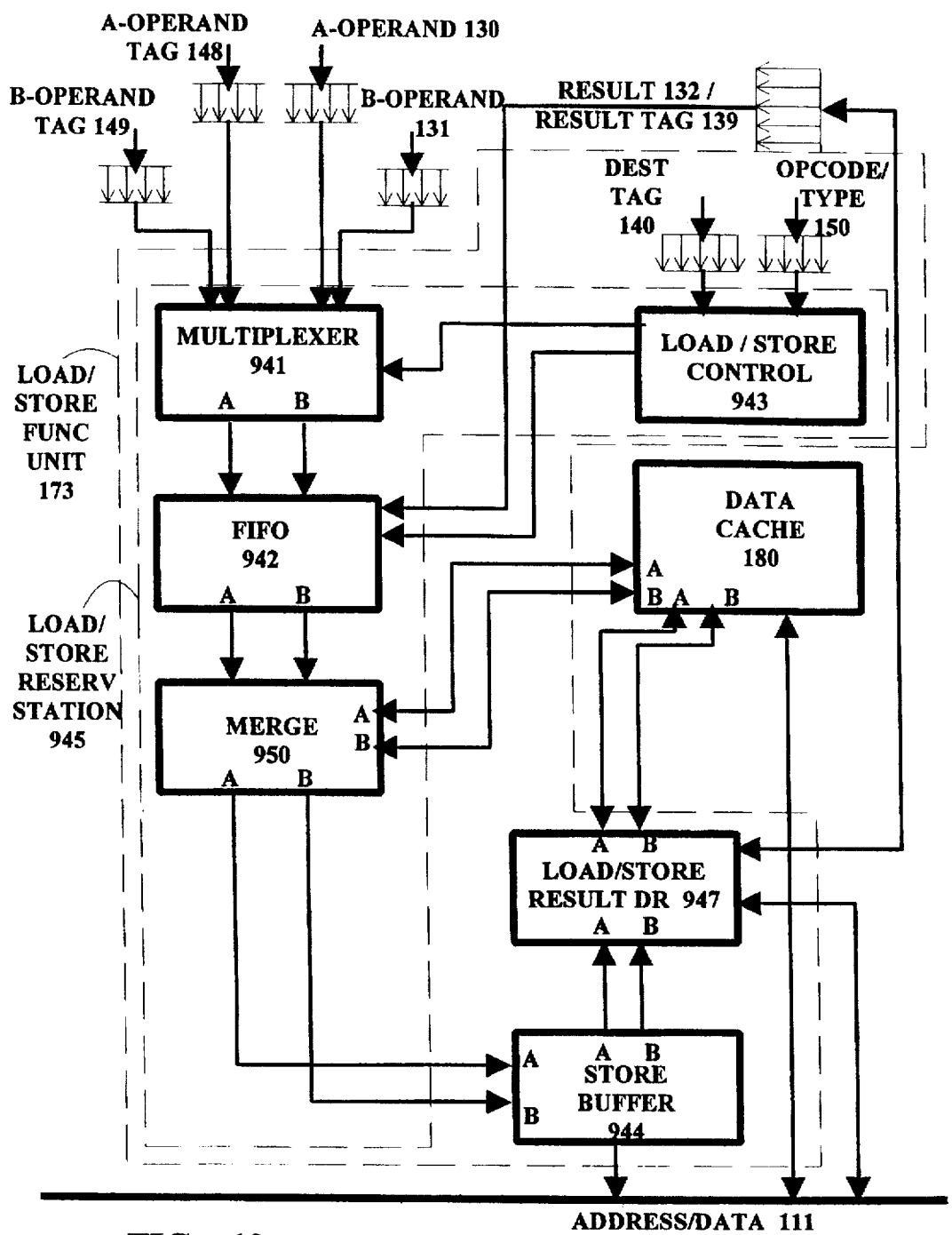
FIG. 12 is a block diagram of a load/store functional unit which includes features for implementing processor resynchronization.

Referring to FIG. 12, load/store functional unit 173 executes LOAD and STORE instructions and interacts with the data cache 180. Load/store functional unit 173 includes a dual-ported reservation station 945, a four-entry store buffer 944 and a load/store result bus driver 947. Each port is connected to the store buffer 944 and the data cache 180 by a channel, which includes 40 data bits and a suitable number of address bits. The reservation station 945 includes a multiplexer 941, a load store controller 943, a merge circuit 950 and a FIFO 942 for queuing up to four ROPs.

The multiplexer 941 includes 4:1 multiplexers that are connected to the A and B-operand and tag busses 130, 131, 148 and 149. Each FIFO entry in the reservation station 945 holds all of the information fields that are necessary to execute a load or store operation. In one processor clock cycle, up to two ROPs are issued and up to two FIFO entries are retired. The load/store reservation station 945 is connected, at its inputs, to the four A and B operand busses 130 and 131, the four A and B operand tag busses 148 and 149, the five result busses 132, the four destination tag busses 140 and the four opcode/type busses 150. The reservation station 945 is also connected to the data portions of ports A and B of data cache 180. Reservation station 945 is connected to store buffer 944 using A and B port reservation station data busses RSDATA A and RSDATA B, respectively, and A and B port reservation station address busses RSADDR A and RSADDR B, respectively, which are also connected to the address lines of ports A and B of the data cache 180. Reservation station 945 is connected to controller 943 using a reservation station load bus RSLOAD and a reservation station shift bus RSHIFT. The store buffer 944 is connected to the load/store result bus driver 947, the address/data bus 111, and the load store controller 943 using a store buffer load bus SBLOAD and a store buffer shift bus SBSHIFT. In addition to connections with reservation station 945 and store buffer 944, load store controller 943 is connected to data cache 180 and reorder buffer 126. In addition to connections to store buffer 944, the load/store result bus driver connects to the data cache 180 and to the five result busses 132 and the five result tag busses 139.

Data cache 180 is a linearly addressed 4-way interleaved, 8 Kbyte 4-way set associative cache that supports two operations per clock cycle. Data cache 180 is arranged as 128 sixteen byte lines or blocks. Each 16 byte entry is stored in a line of four individually addressed 32-bit banks. Address (ADDR) and data (DATA) lines connect data cache 180 to load/store functional unit 173 as shown. More specifically, data cache 180 includes two sets of address and data paths between data cache 180 and load/store unit 173 to enable two concurrent accesses from load/store functional unit 173. Individually addressable banks permit the data cache 180 to be accessed concurrently by two ROPs, such as two simultaneous load operations, while avoiding the overhead identified with dual porting. These two accesses can be between 8 and 32 bit load or store accesses aligned to the 16 byte data cache line size.

A load operation reads data from the data cache 180. During a load operation, reservation station 945 supplies an address to data cache 180. If the address generates a cache hit, data cache 180 furnishes the data which is stored in a corresponding bank and block of a store array (not shown) of the data cache 180 to reservation station 945. A doubleword is transferred from the data cache 180 to the load/store result bus driver 947. The upper two bits of the load/store instruction opcode specify the size of the result to be produced. The types of results are doublewords, words, high bytes or low bytes. Unused bits are set to zero. For high bytes, the result produced by executing the ROP is remapped into the middle bit field before the result is driven onto the result busses 132 by the load/store result bus driver 947. High bytes are always read from the middle bit field of the operand. Load/store result bus driver 947 masks unused portions of data that are read by the doubleword read operation. If the AHBYTE signal is set, the load/store result bus driver 947 remaps the low field data bits <7:0> into the middle field bits <15:8>. The bus driver 947 then drives the result on one of the result busses 132. If the address was supplied to data cache 180 over port A, then the data is provided to reservation station circuit 945 via port A. Otherwise, if the address was presented to data cache 180 using port B, then the data is communicated to reservation station 945 using port B. Addresses are communicated to data cache 180 and data is received from data cache 180 using ports A and B simultaneously. As the load/store result bus driver 947 drives the result onto one of the result busses 132, it also drives the corresponding one of the result tag busses 139.

A store operation is a doubleword read operation from data cache 180, followed by a doubleword write back to the cache 180. During a store operation, an addressed doubleword is first transferred from data cache 180 to store buffer 944. Then the data is communicated from reservation station 945 to store buffer 944. If the store data is 32 bits or more in width, the data replaces the doubleword that was read from data cache 180. If the store data is less than 32 bits in width, the merge circuit 950 merges the applicable data fields into the doubleword that was read from data cache 180. If a portion of the store data is not available, then an operand tag is used to replace the unavailable data. The mix of data and tags is held in the store buffer until all bit fields of missing data are forwarded from the result busses. By holding partial data in the store buffer 944 until all fields are available, only full doublewords are written to cache 180. Writing of individual 8-bit bytes is not necessary. The merged data is then communicated back to the data cache 180 by the load/store result bus driver 947. Load and store operations of store data that are greater than 32 bits in width execute multiple accesses to the data cache 180 and construct the data in store buffer 944 before writing it back to the data cache 180. When the store operation is released, the data and corresponding address are communicated using address/data bus 111 to data cache 180.

A suitable load/store functional unit is disclosed in United States patent application Ser. No. 08/146,376 filed on Oct. 29, 1993 (William M. Johnson et al., "High Performance Load/Store Functional Unit and Data Cache," Attorney Docket Number M-2281), which is incorporated herein by reference in its entirety.

Figure 13B:
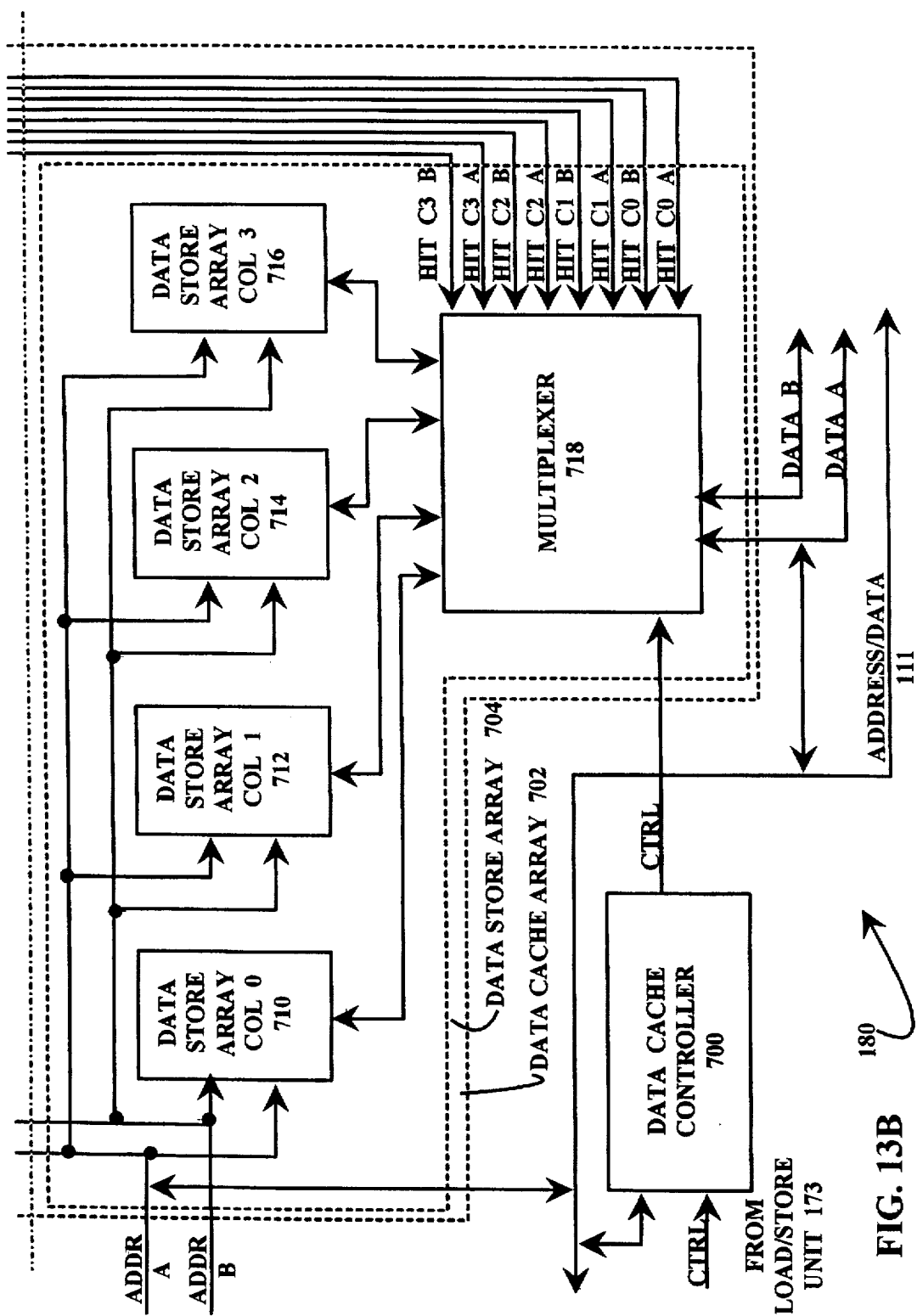
FIG. 13 is a block diagram of a data cache which includes features for implementing processor resynchronization.

Referring to FIG. 13, data cache 180 includes data cache controller 700 and data cache array 702. Data cache controller 700 controls various operations of data cache 180. Data cache controller 700 receives control signals (CONTROL) from load/store functional unit 173 and IAD bus 111 and generates control signals to data cache array 702. Data cache array 702 stores data in blocks and supplies access to the data blocks upon addressing of a block. Data cache array 702 receives address signals and data signals from load/store functional unit 173 and also communicates with IAD bus 111. Data cache 180 is four-way associative and takes two linear addresses and accesses its four banks in a first phase of single clock cycle. The resultant load operations complete in the second phase of the cycle, and can then drive one of the result buses 132. Requests by functional units for the result busses 132 are arbitrated with requests from the other functional units.

Data cache array 702 includes two arrays, a data store array 704 and a data linear tag array 706. Data cache array 704 receives and supplies two data signals (DATA A, DATA B) to load/store functional unit 173. Load/store functional unit 173 addresses data linear tag circuit 702 and data store array 704 using two linear addresses, ADDR A and ADDR B. Accordingly, data cache array 702 is a dual ported memory array, both ports being connected with load/store functional unit 173 to allow two data values to be written or read simultaneously. Data store array 704 also receives control signals from linear tag array 706.

Data cache controller 700 generates control signals to data cache array 702, including a linear address signal. Middle order bits of the linear address signal furnish a cache block index for addressing a block within each column of the data linear tag array 706 and retrieving an entry from data store array 704. High order bits of each linear address are compared to the linear data tags of each column of linear tag array 706, and select one of the columns which are accessed by the cache block index. Low order bits of each linear address provide an offset into the retrieved entry to access the byte addressed by the linear address.

Entries in the data store array 704 include a sixteen byte block of data. Entries in data linear tag array 706 include a data linear tag value, a linear tag valid bit, a data valid bit, a dirty bit and valid physical translation bit. The data linear tag value, which corresponds to the high order 21 bits of the linear address, indicates the linear block frame address of a block which is stored in the corresponding data store array 704 entry. The linear tag valid bit indicates whether the linear tag is valid. The data valid bit indicates whether a corresponding entry in store array is valid. The dirty bit indicates that a cache line has been modified and is used to indicate to the data cache store array 704 when an accessed line has been previously modified. The valid physical translation bit indicates whether an entry corresponds to a successful physical tag hit.

Data cache 180 is arranged in four 2-Kbyte columns or banks, which are organized such that one line in the data cache has 4 bytes in each of the 4 banks. Thus, as long as the linear address of bits [3:2] of the two accesses are not identical, the two accesses can access the data array in data cache 180 concurrently. Data linear tag array 706 and data cache store array 704 are configured in a manner similar to that of instruction store array 250 and address tag array 252 in instruction cache 116. However, data cache 180 functions as a dual-ported data cache in which data linear tag array 706 simultaneously receives two linear addresses (ADDR A, ADDR B) and data store array 704 simultaneously receives and supplies two data signals (DATA A, DATA B). Data store array 704 includes four separate data store arrays, columns 0, 1, 2 and 3, respectively 710, 712, 714 and 716, and a multiplexer circuit 718. Multiplexer 718 receives control signals from data linear tag array 706 which indicate whether there is a match to a linear tag value stored in a respective linear tag array. Multiplexer 718 receives and supplies data to store arrays 710, 712, 714 and 716. Multiplexer 718 also receives and supplies data to the IAD bus 111 and load/store functional unit 173.

Linear tag array 706 includes linear tag array columns 0, 1, 2 and 3, respectively 720, 722, 724 and 726, each of which is connected with a corresponding compare circuit 730, 732, 734 and 736. Each column of data cache 180 includes a store array, a linear tag array and a compare circuit, all of which receive the linear addresses, ADDR A, ADDR B from load/store functional unit 173.

Figure 14:
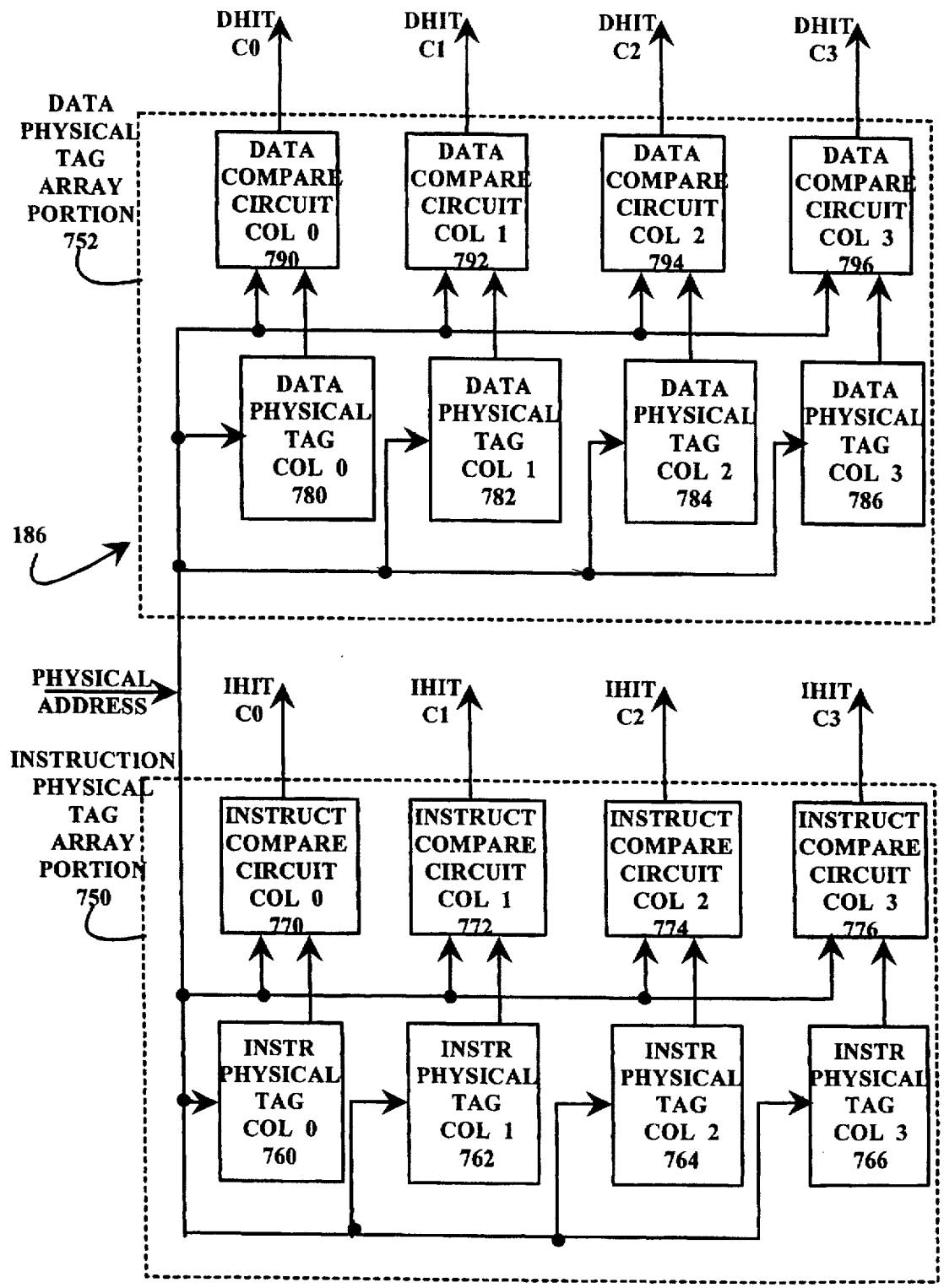
FIG. 14 is a block diagram of a physical I/D tags block which includes features for implementing processor resynchronization.

Referring to FIG. 14, physical I/D tags block 186 includes an instruction physical tag array portion 750 and a data physical tag array portion 752. Instruction physical tag array portion 750 includes several instruction physical tag arrays 760, 762, 764 and 766 and several instruction compare circuits 770, 772, 774 and 776. Data physical tag array portion 752 includes several data physical tag arrays 780, 782, 784 and 786 and several corresponding data compare circuits 790, 792, 794 and 796. Instruction physical tag arrays 760, 762, 764 and 766 correspond to columns 0, 1, 2 and 3 of instruction cache 116. Data physical tag arrays 780, 782, 784 and 786 correspond to columns 0, 1, 2 and 3 of data cache 180.

Instruction physical tag arrays 760, 762, 764 and 766 receive the least significant bits of the physical address that is furnished by bus interface unit 184 and supply a respective physical tag to compare circuits 770, 772, 774 and 776, which also receive the most significant bits of the same physical address. Compare circuits 770, 772, 774 and 776 furnish respective instruction column hit indication signals (IHIT C0, IHIT C1, IHIT C2 and IHIT C3) to HIT COL inputs of a multiplexer circuit (not shown) in instruction store array 250 to select the column store array for supplying an output instruction.

Data physical tag arrays 780, 782, 784 and 786 receive the least significant bits of the physical address from bus interface unit 184 and furnish respective data physical tags to compare circuits 790, 792, 794 and 796, which also receive the most significant bits of the same physical address. Compare circuits 790, 792, 794 and 796 supply respective data column hit indication signals (DHIT C0, DHIT C1, DHIT C2 and DHIT C3) to the HIT COL A inputs of multiplexer 718 in data store array 704 to select the column store array for supplying output data.

Physical tag entries in the instruction physical tag arrays 760, 762, 764 and 766 and the data physical tag arrays 780, 782, 784 and 786 include a physical tag value (PTAG), a physical tag valid bit (PV), and a shared bit (S). Physical data tag entries also include a modified bit (M), a cache disable bit (CD) and a write-through bit (WT). Physical instruction tags have only a valid bit, since physical instruction cache cannot be modified. A PTAG entry identifies a physical address which results from translation of a linear address associated with a corresponding entry in the store array. The physical tag valid bit designates whether the associated entry of the corresponding store array contains valid information. The shared bit designates whether another cache in a computer system which includes processor 110 maps to the same physical memory. The modified bit indicates whether the data stored in the store array has been written or modified and is no longer consistent with corresponding data stored externally of the cache. The cache disable bit indicates whether an entry is cache disabled and cannot be written on a cache write. The write-through bit indicates that when the entry is written to the cache, it should also be written to the entry's corresponding external memory location.

Figure 15:
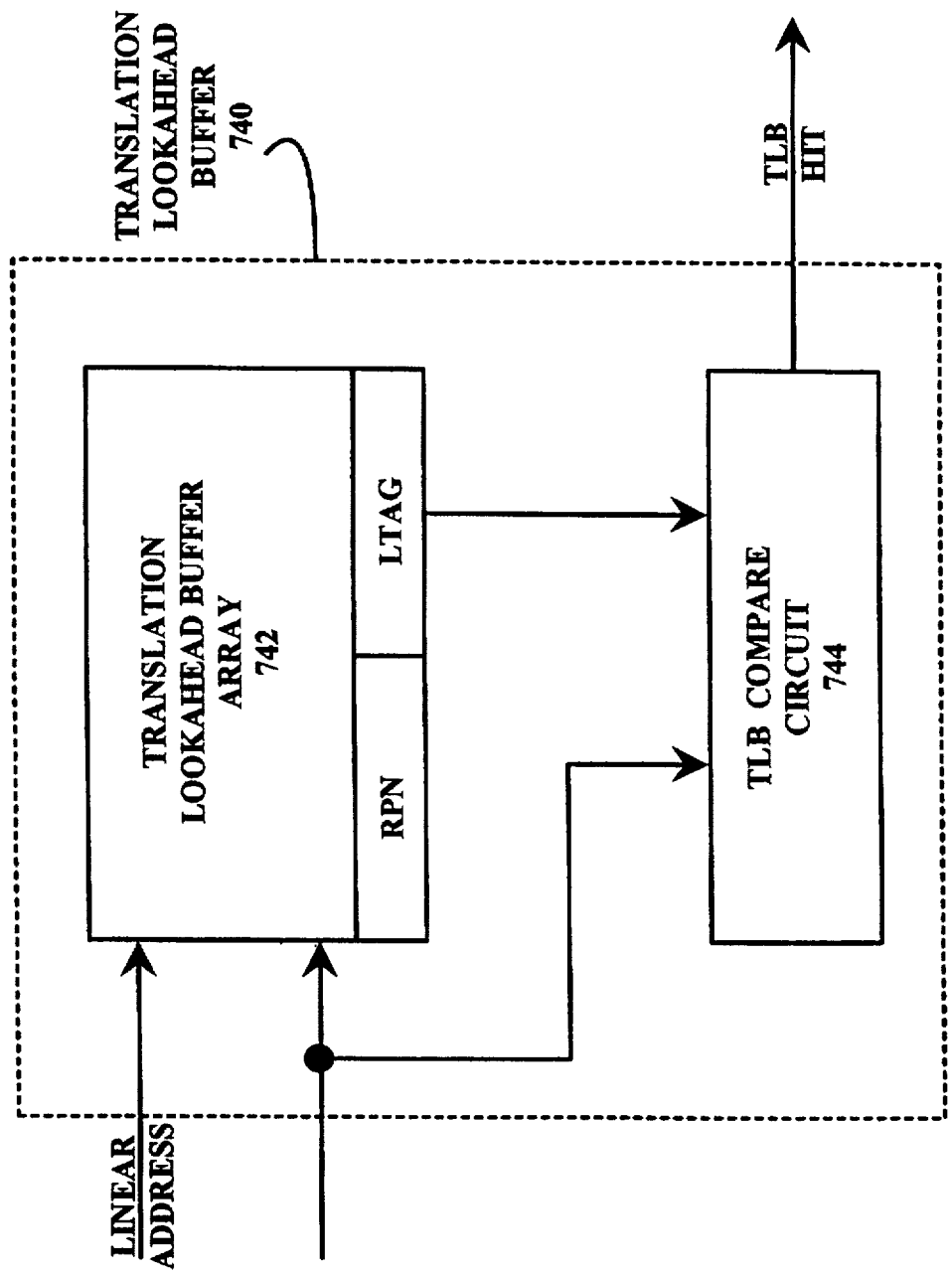
FIG. 15 is a block diagram of a translation lookaside buffer which includes features for implementing processor resynchronization.

Referring to FIG. 15, memory management unit (MMU) 188 functions as a translation circuit for translating between linear addresses and physical addresses. TLB 740 handles the linear to physical address translation procedure defined for the x86 architecture. This procedure uses a cache of the most recent linear to physical address translations to prevent searching external page tables for a valid translation. MMU 188 includes translation lookaside buffer (TLB) 740 having a TLB array 744 and a TLB compare circuit 742. TLB array 744 is organized as a 4-way set associative cache. Each set includes 32 entries, thus accommodating 128 TLB entries. Each TLB entry of TLB 188 includes a linear tag value (LTAG) and a physical tag value (PTAG). LTAG corresponds to the most significant bits of a linear address. PTAG corresponds to the most significant bits of a physical address that corresponds to a linear address. PTAG is concatenated with low-order bits of the linear address which corresponds to LTAG to obtain the physical address using only a single level of page tables.

A cache miss is a condition that occurs when a data value which is not stored in data cache 180 is requested by load/store functional unit 173. Processor 110 responds to a cache miss by loading the requested data value from external memory 114 into data cache 180.

To load the data cache 180, load/store functional unit 173 translates the logical address for the sought data to a linear address and applies the linear address to memory management unit 188. MMU 188 checks the linear address against the linear tag portion of TLB array 744, using TLB compare circuit 742 to determine whether there is a TLB hit. If so, high-order bits of the physical address, which is obtained from translating the linear address, is written into the entry of data physical tag array portion 752 which corresponds to the column select bits and cache block index bits of the linear address. The data linear tag array 720, 722, 724 and 726 which corresponds to the column select bits of the linear tag and the cache block index of the linear address bits is written with the linear tag from TLB array 744. If there is not a TLB hit, then TLB 744 is updated by memory management unit 188 to include the address of the requested value so that a TLB hit results and then the real page number is written to data physical tag portion 752.

A read request is then made by load/store functional unit 173 to the external memory and the value which is stored in the external memory 114 at the physical address which corresponds to the linear address is retrieved from the external memory. This value is stored in the line and column of store array 704 which corresponds to the line and column locations of the value's physical and linear tags which are stored in the respective physical and linear tag arrays. The corresponding physical tag valid bit in the physical tag array 752 is set to indicate that the physical tag is valid. The corresponding data valid bit, linear tag valid bit and valid physical translation bit in the linear tag array 706 are also set to indicate that the entry corresponding to the linear tag is valid, that the linear tag is valid and that the entry provides a successful physical translation.

When the logical address for this value is again requested by a functional unit, load/store functional unit 173 converts the logical address to the linear address for comparing the linear tags in linear address tag array 706 to the requested address. Because the valid bit is set and the valid physical translation bit is set, a linear address hit occurs, and the entry which is stored in the corresponding line of data store array 702 is forwarded to the requesting functional unit. During accessing by load/store functional unit 173, there is no need to access either physical I/D tags block 186 or TLB circuit 188 since the valid physical translation bit is set indicating that the entry has a valid physical translation. This process is repeated for each data cache access unless TLB 744 is updated.

Processor 110 accommodates self-modifying code, which is program code that modifies itself during execution by writing new opcodes, addresses or data values over existing instructions. Self-modifying code arises in the context of processor 110 operations when a store operation writes to addresses that are currently in instruction cache 116.

Referring to FIGS. 2 and 11 through 15, a store operation is performed as a read modify write operation wherein the first portion of a store operation is similar to a load operation. As for a load operation, the load/store functional unit 173 determines whether the data value at the location to be stored is available in data cache 180. A cache index, the least significant 11 bits of the linear address, is calculated as part of the linear address computation. This cache index linear address is used to access the appropriate line and bank of data cache store array 704. When the appropriate line and bank are accessed, the linear address is used to access the appropriate column of store array 704 by comparing the linear tags. If the tags match, then a data cache hit results. When a speculative load operation is being performed by load/store functional unit 173 and the data value to be loaded is not available in data cache 180, then a speculative data cache miss results.

When data cache 180 is accessed and the result is a cache miss, the TLB 740 is accessed in MMU 188 and the physical tags are accessed in physical I/D tags block 186 to determine the physical address of the data value. This physical address is then checked within MMU 188 to confirm that the physical address does not violate any protection checks. Load/store controller 943 performs a segment limit check and a protection check, as is well known in the art, on the linear address. As part of the protection check, both data cache 180 and instruction cache 116 memories are tested for conflicts. Since mapping of linear to physical addresses allows instruction accesses and data accesses to request the same physical location, both caches are tested when a miss occurs in the linear caches. The MMU 188 determines that a store operation calls for a data cache modification of instruction cache in the case of self-modifying code. Since a store operation is requested, this is a write to program code memory so that the instruction cache block and its associated predecode information are invalidated. This is done by clearing the valid bits in the address tag array 252 entries, which deallocates the instruction block in instruction cache 116 and permits allocation of this block for the data cache 180. The first access of the newly allocated data block is a load, followed by a local store to the data cache 180. The resulting data value is returned to reservation station 945 via the DATA A data path. This data value is formatted by result bus driver 947 to the result bus 0. Appropriate modified bits are asserted in the physical I/D tags 186 to indicate that data stored in the data store array 704 has been written or modified and is no longer consistent with corresponding data stored externally of the cache. Appropriate dirty bits are asserted in entries of data linear tag array 706 to ensure that information in external memory 114 is consistent with data cache 180. Cache array 704 is updated with the tag valid bits of the line from the tag buses. The data value, destination tag and status are driven onto the next available result bus. The data value and corresponding destination tags are driven onto result bus 0 for port A and are also stored in the next available entry of data store array 704. This value is held in data store array 704 until the store operation is retired from reorder buffer 126, which occurs when there are no other instructions pending. Reorder buffer 126, indicates to load/ store functional unit 173, using the load store retire signal, that the store instruction may be retired, i.e., that the store may be performed. Because stores actually modify the state of the data value, stores are not speculatively performed and must wait until it is clear that the store is actually nonspeculative before reorder buffer 126 allows the store to be executed.

Retirement of the data cache store of instruction cache 116 invokes a resynchronization response, which flushes all speculative ROPs from reorder buffer 126 and causes instruction cache 116 to begin fetching instructions at the point of the last retired instruction—the instruction following immediately after the store ROP. All pending ROPs after the store are thus refetched. Resynchronization is applied only to instructions subsequent to the self-modifying code store.

Figure 16:
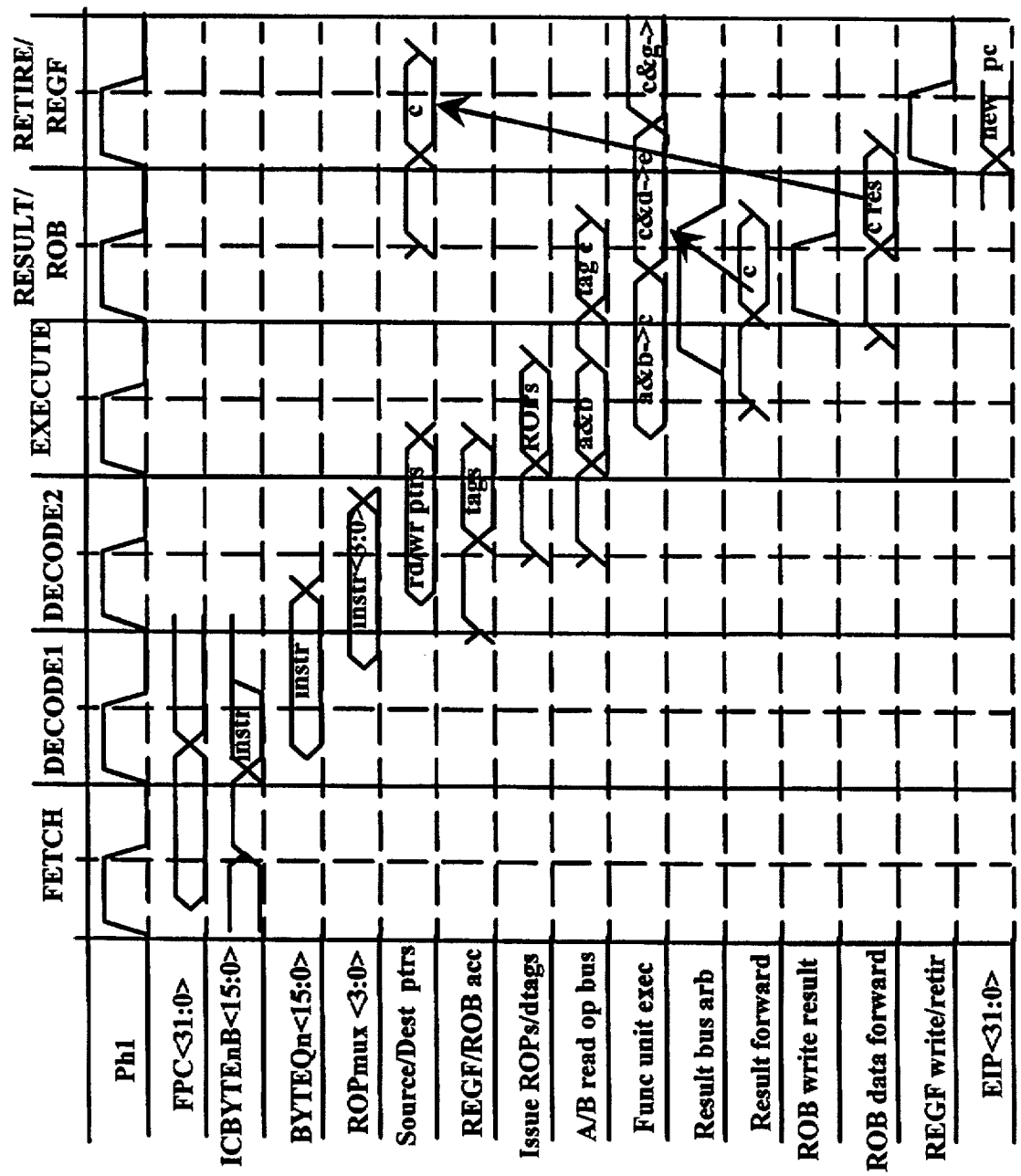
FIG. 16 is a timing diagram for a multiple stage sequential execution pipeline in the processor.

Referring to FIG. 16, processor 110 operates a six stage pipeline, in which processor 110 executes a sequential stream of X86 bytes with the execution path correctly predicted taken and the instructions being available directly from instruction cache 116. Each stage includes two phases, called phase 1 and phase 2.

The stages include successive ordered fetch, decode1, decode2, execute, result and retire pipeline stages, represented by vertical columns. Selected signals are presented in horizontal rows as they appear in the various stages of the pipeline, including system leading edge clocking signal (Ph1), fetch PC bus signal (PPC<31:0>), instruction store array 250 bus output signals (ICBYTEnB<15:0>), byte queue 135 bus signals (BYTEQn<7:0>) and instruction decoder 118 instruction X86 to ROP conversion signals (ROPmux). The selected signals further include signals driven on source operand pointer busses 136 and 137 (source/dest pointers), signals driven on the operand busses 130 and 131 (REGF/ROB access), signals for dispatching ROPs and destination tags to the functional units (issue ROPs/dest tags), signals for functional unit reading of the operand busses 130 and 131 (A/B read oper buses) and signals for ROP execution by the functional units (Func unit exec). Designations a&b→c and c&d→e and c&g→ indicate arbitrary ROP execution operations in the form: source A, source B>destination. The selected signals further include result bus arbitration signals (Result Bus arb), signals for forwarding of results on the result busses 132 (Result Bus forward), signals for writing of results from result busses 132 to reorder buffer 126 (ROB write result), and signals for driving result tags 139 to functional unit reservation stations for data forwarding (ROB tag forward). The selected signals still further include signals for retiring results from reorder buffer 126 to register file 124 (REGF write/retire) and signals for retiring EIP<31:0>.

In fetch, instruction cache 116 forms a new fetch PC (FPC<31:0>) in phase 1 and uses the fetch PC to access the cache array 200 in phase 2. Linear instruction cache tag arrays are accessed in parallel with the store arrays. Late in fetch phase 2, instruction cache 116 identifies valid bytes of the currently fetched block by determining whether the cache access is a hit, identifying X86 bytes that are predicted executed and ascertaining whether the next block predicted executed is sequential or nonsequential. In addition to accessing the tag and store arrays, the fetch program counter value also accesses successor array 254, which may also be called a branch prediction array. Successor array 254 identifies which of the x86 bytes are predicted executed, and whether the next block predicted executed is sequential or non-sequential. This information, which is also accessed in PH2 of the fetch cycle, determines which of the bytes of the currently fetched block are driven as valid bytes into byte queue 135. Instruction cache 116 forwards valid predicted executed bytes to byte queue 135.

Since branch prediction occurs in fetch phase 2, the next block to be prefetched can be either sequential or nonsequential. In either case, one clock cycle is available for reaccessing the cache array 200 so that a branch out of a block has the same performance as sequential operation.

During decode1, speculative instructions are fetched, instruction decoder 118 decodes instructions and the instructions become valid. During early decode1 phase 1, prefetched and predicted executed bytes are driven to a designated fill position and merged with pending bytes in byte queue 135, shown as signal ICBYTEnB<15:0>. Midphase 1 of decode1, merged bytes are tendered to instruction decoder 118, via signal BYTEQn<15:0>, for aligning opcodes to ROP dispatch positions D0, D1, D2, and D3 and dispatching the ROPs in signal ROPmux. Instruction decoder 118 maintains a copy of the fetch PCs of each X86 instruction in byte queue 135 by counting the number of bytes between instruction boundaries, or detecting a branch and assigning the target PC value to the first X86 byte fetched from that location. In decode1 phase 2 and decode2 phase 1, instruction decoder 118 determines functional unit destinations, source and destination operand pointer, values and sizes, and immediate address and data values for the ROPs. Instruction decoder 118 drives these signals on appropriate busses, shown in FIG. 16 as the signal source/dest pointers.

During decode2, outputs of instruction decoder 118 become valid. For example, operand busses 130 and 131 and operand tag busses 148 and 149 become valid early in decode2, allowing the operands from register file 124 and reorder buffer 126 and operand tags from reorder buffer 126 to become available in late decode2. In decode2 phase 1, up to four reorder buffer 126 entries are allocated for ROPs that may issue in the next clock phase. When an ROP is allocated, an allocated bit in its reorder buffer 126 entry is asserted. In decode2 phase 2, source read pointers 136 and 137 for all allocated ROPs are applied to register file 124 and reorder buffer 126 for respectively accessing nonspeculative and speculative operand data via signals REGF/ROB access. By allocating ROP entries in phase 1 and accessing them in phase 2, reorder buffer 126 can check for data dependencies upon entries in the current dispatch window as well as previously dispatched entries.

Instruction decoder 118 maintains information for deriving a copy of fetch PCs of each of the x86 instructions in byte queue 135 by counting the number of bytes between instruction boundaries or detecting a branch within instruction cache 116 and attaching the target PC to the first x86 byte fetched from that location. Using opcode and ROP positioning information, as well as the immediate fields stored in byte queue 135, instruction decoder 118 statically determines program counter information during PH2 of the first decode cycle and PH1 of the second decode cycle. By the end of PH1 of the second decode cycle, all the register read and write pointers are resolved and the operation is determined. This is shown in FIG. 16 as the assertion of the source A/B pointer values.

During execute, the operand busses 130 and 131 and tags 148 and 149 become valid and are furnished to functional unit reservation stations. Functional units execute ROPs and arbitrate for a result bus. In execute, ROPs are issued to the functional units via signals issue ROPs/dest tags on opcode/type busses 150 and via signals A/B read oper buses on operand busses 130 and 131. In late execute phase 1, functional units access signals from the opcode/type busses 150 to determine whether to queue one or more of the dispatched ROPs. If a functional unit is ready to execute an ROP, it begins execution in late execute phase 1 and continues execution through phase 2 in timing signals func unit exec. At the end of phase 2, the functional unit inspects a result bus grant signal (not shown) from a result bus arbitrator (not shown) in timing signal result bus arb to determine whether a result bus is granted. If access to the result bus is granted, then the granted functional unit drives the allocated result bus in the following result phase 1.

During result, signal result bus forward times forwarding of results from functional unit result bus drivers to result bus inputs to the functional units and to reorder buffer 126. In result phase 1, results, result tags and status information are driven to reorder buffer 126 on busses 132, 139 and 141 respectively and written via timing signal ROB write result. The status information includes status flags, including valid, exception and mispredict flags. At this time, a VALID bit is asserted in the ROB entry for a ROP that has produced a valid result. In result phase 2, newly allocated result data is detectable by subsequent ROPs that use the data as a source operand and result data is forwarded to operand busses 130 and 131 in timing signals ROB tag forward.

In PH1 of retire, the result of the ROP is written from reorder buffer 126 to register file 124 and EIP register 620 is updated to point to the next instruction to be retired in signal REGF write/retire. In PH1 of the retire cycle, the entry in reorder buffer 126 is deallocated and the result field is written from reorder buffer 126 to register file 124. Reorder buffer 126 maintains and updates the EIP register 620 to track the program counter of instructions that are retired and, thus, no longer speculative. EIP<31:0> timing signals update the EIP register 620 and drive the EIP <31:0> bus as an ROP is retired. Because reorder buffer 126 entry is deallocated, subsequent references to the register result in a read from register file 124 rather than a speculative read from reorder buffer 126. Reads from register file 124 indicate the actual state rather than the speculative state of processor 110.

Figure 17A:
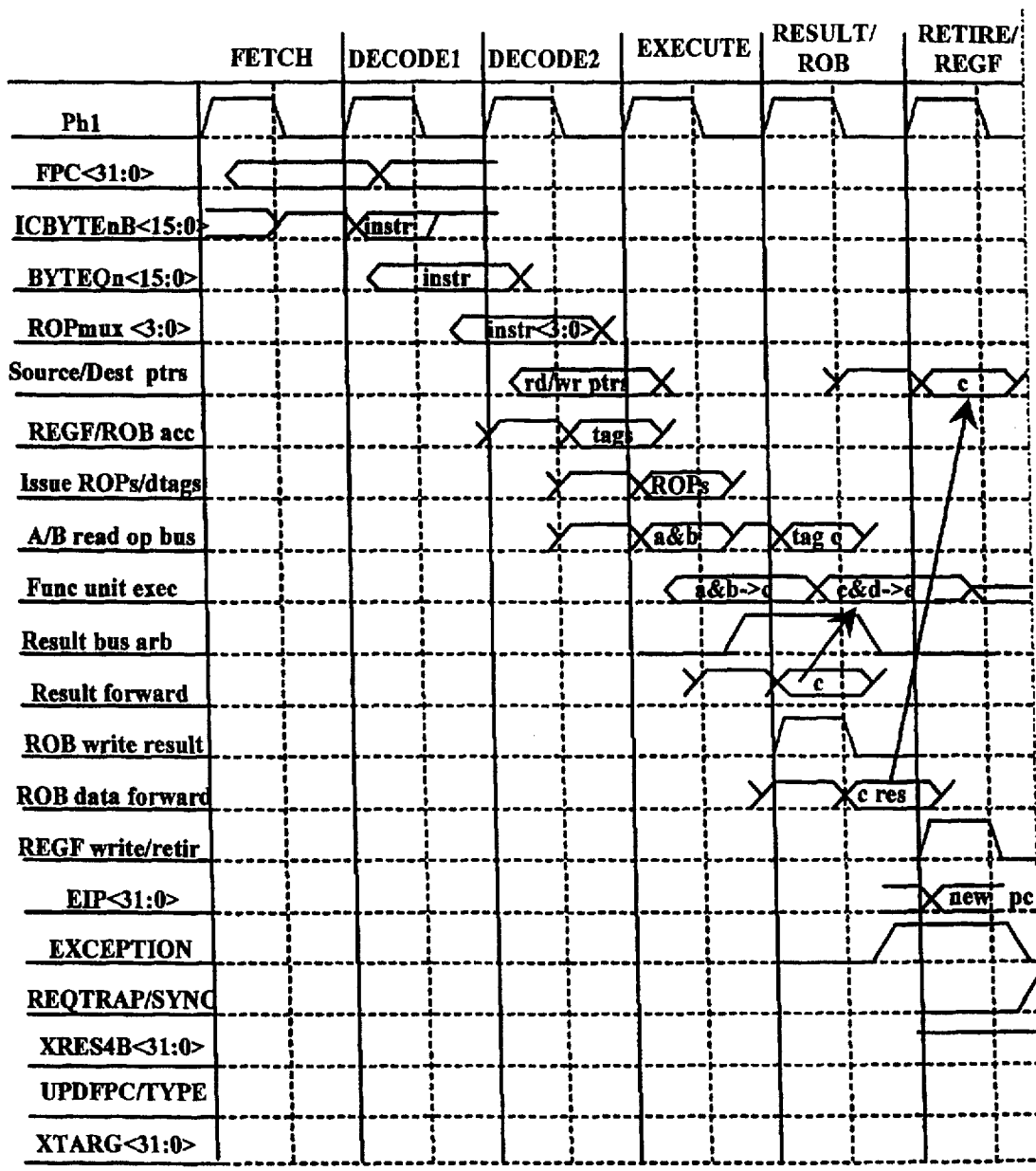
FIG. 17 is a timing diagram for a multiple stage sequential execution pipeline in the processor as it is resynchronized.
Figures 17, 17B:
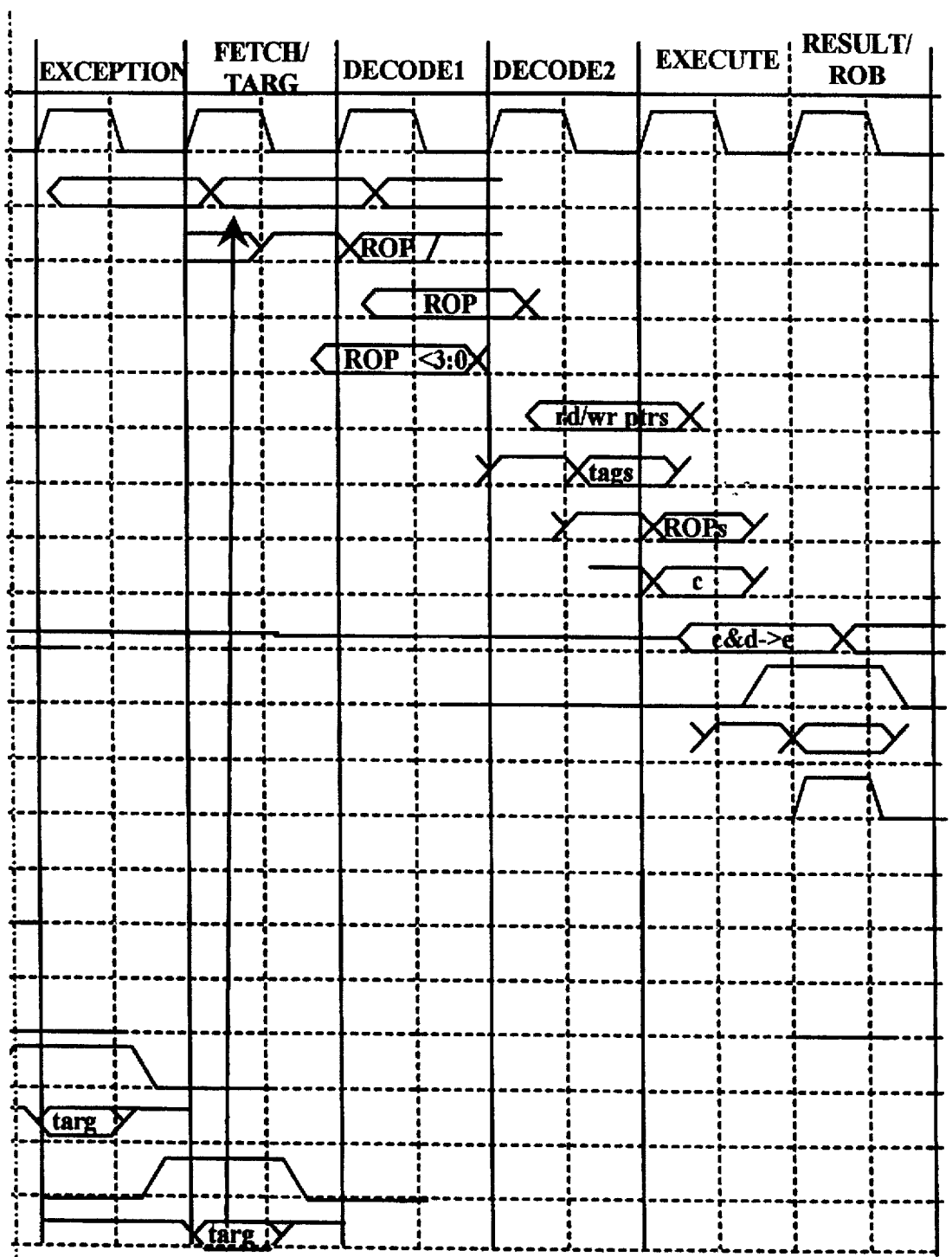

FIG. 17, depicts a timing diagram of processor 110 as a condition which is designated to trigger a resynchronization response transpires in a first cycle and resynchronization is attained in cycles subsequent to the first. Signals of clock cycles precedent to a resynchronization condition are the same as signals for a correctly predicted branch shown in FIG. 16. However, additional exception flag EXCEPTION, request trap REQTRAP, synchronization flag SYNC, XRES4B<31:0> pointer, update fetch PC UPDFPC/ FPCTYPE and target PC XTARGET<31:0> signals are applied to processor 110 to control the resynchronization response. Exception flag EXCEPTION is communicated from reorder buffer 126 to functional units and other blocks to trigger local initialization of the functional units and blocks, terminating in-progress execution of ROPs. For example, EXCEPTION commonly initiates flushing of functional unit reservation stations. Request trap REQTRAP is a line from reorder buffer 126 to branch unit 170 which, in combination with XRE84B<31:0>, requests an exception, trap response or resynchronization response. XRES4B<31:0>, also communicated from reorder buffer 126 to branch unit 170, informs branch unit 170 of the fetch PC from which instructions are to be fetched following an exception. XRES4B<31:0> is an instruction pointer to which the processor 110 is directed as it responds to an exception. Synchronization flag SYNC is used to qualify REQTRAP and to distinguish a resynchronization response from an exception response. In an exception response, SYNC is disasserted so that the request trap REQTRAP signal and associated XRE84B<31:0> pointer cause processor 110 to fetch instructions starting at the program instruction location designated by XRES4B<31:0>. In a resynchronization response, SYNC is asserted to qualify the value on the XRES4B<31:0> pointer. XRES4B<31:0> carries either an MROM address for redirecting processor operations following an exception or the EIP register 620 contents for redirecting processor operations following a resynchronization condition. When SYNC is asserted, XRE84B<31:0> carries extended instruction pointer EIP and the request trap signal REQTRAP causes processor 110 to fetch instructions starting at the program instruction location designated by pointer EIP.

For resynchronization upon a stack underflow, the EXCHANGE SYNC signal is also communicated from reorder buffer 126 to branch unit 170, causing branch unit 170 to invoke the resynchronization FXCH ROP sequence. Update fetch PC UPDFPC and XTARGET<31:0> are communicated from branch unit 170 to instruction cache 116. Update fetch PC UPDFPC/PPCTYPE signals instruction cache 116 to update the fetch program counter while XTARGET<31:0> holds the address to which the fetch PC is updated. FPCTYPE signal qualifies the value on XTARGET<31:0> pointer in the manner of the SYNC signal, thus distinguishing the type of fetch pointer redirection, either MROM address or EIP pointer fetching.

A functional unit detects a resynchronization condition and, during timing phase RESULT/ROB, sends a resynchronization flag on status busses 141 to reorder buffer 126 via signal ROB write result. A RESYNC bit and an EXCEPTION bit are held in the entry of reorder buffer 126 associated with the ROP. When the ROP is retired, the EIP generator circuit 630 tests various status bits, including the RESYNC and EXCEPTION bits. Assertion of the RESYNC and EXCEPTION bits cause reorder buffer 126 to make a trap vector request. During timing phase RETIRE/REGF, notice of the exception is communicated via the EXCEPTION signal, from reorder buffer 126 to the functional units over exception line 160. Reorder buffer 126 relays the EXCEPTION signal to all of the functional units, which flush their reservation stations, and other units including instruction decoder 118 and instruction cache 116. One cycle after the EXCEPTION signal is sent to all functional units, reorder buffer 126 sends the REQTRAP and SYNC signals to branch unit 170 during an exception phase. Reorder buffer 126 is flushed during the exception phase as the speculative state is cleared in one clock cycle by setting the head 616 pointer and the tail 618 pointer to zero.

In a fetch/target phase, branch unit 170 sends the update fetch PC UPDFPC/FPCTYPE signal and the XTARGET<31:0> address to instruction cache 116. When the SYNC signal is set, branch unit 170 sets XTARGET<31:0> to the last retired EIP address. XTARGET<31:0> designates the program counter to which instruction fetching is redirected for resynchronization. Recovery includes a three cycle delay from discovery of a resynchronization condition during the execute stage of an instruction to the fetch of instructions in a resynchronized path.

Fetch stages are similar in standard operations and a resynchronization response, except that for resynchronization, target pc bus 122 is driven from branch unit 170 to instruction cache 116 in timing signal XTARGET<31:0> to furnish the program counter to which fetching is redirected. Branch unit 170 drives the target to instruction cache 116 at the same time that it drives an update fetch PC UPDFPC/FPCTYPE indication to instruction cache 116, shown in timing signal UPDFPC/FPCTYPE. Instruction cache 116 drives the target PC onto the fetch pc bus 206 and accesses cache array 200 in fetch phase 2. If a cache hit occurs, bytes are driven to the byte queue 135 as in the correctly predicted case.

Decode1, decode 2 and execute stages are similar to the standard condition following a resynchronization.

While the invention has been described with reference to various embodiments, it will be understood that these embodiments are illustrative and that the scope of the invention is not limited to them. Many variations, modifications, additions and improvements of the embodiments described are possible. For example, the conditions for which a resynchronization is applied may include other types of conditions such as error conditions or other anomalies in processing. The logic and circuits that implement the resynchronization operation may be located in various other internal blocks of the processor, rather than what is depicted in the illustrative embodiment. These and other variations, modifications, additions and improvements may fall within the scope of the invention as defined in the claims which follow.

We claim:

1. A method of operating a superscalar processor which determines an in-order sequence of instruction fetching, fetches the instructions in-order, queues the fetched instructions in-order, speculatively executes the instructions out-of-order to generate results and flags associated with the results, retires executed instruction results in-order, and tracks the retiring of executed instruction results, the method comprising the steps of:

predefining a resynchronization condition;

detecting the predefined resynchronization condition as an instruction is executed; and resynchronizing the processor on retiring of the result of an instruction for which the resynchronization condition is detected, the resynchronization operation including the steps of:

flushing the queue of fetched instructions including flushing of executed instruction results and flags associated with the results; and redirecting the in-order sequence of instruction fetching to an instruction point located based on the tracking of the retiring of instruction results.

2. A superscalar microprocessor comprising:

a first tracking means for tracking an in-order sequence of instruction fetching;

an instruction fetch means coupled to the first tracking means for fetching the instructions in-order;

a reorder buffer array coupled to the instruction fetch means for queuing the fetched instructions in-order;

an execution means coupled to the instruction fetch means and coupled to the reorder buffer array for speculatively executing the instructions out-of-order to generate results and flags associated with the results;

a retiring means coupled to the execution means for retiring executed instruction results in-order;

a second tracking means coupled to the retiring means for tracking the retiring of executed instruction results;

a resynchronization condition detecting means coupled to the functional unit for detecting a resynchronization condition as the execution means executes an instruction; and a resynchronization control means coupled to the retiring means responsive to retiring of the result of an instruction for which a resynchronization condition is detected, the resynchronization control means further including:

a queue control means coupled to the resynchronization control means for flushing the queue of fetched instructions including flushing of executed instruction results and flags associated with the results; and a branch means coupling the second tracking means to the first tracking means and redirecting the in-order sequence of instruction fetching based on the tracking of the retiring of instruction results.

3. A superscalar processor including a fetch program counter for determining an in-order sequence of instruction fetching, an instruction cache coupled to the fetch program counter for fetching the instructions in-order, a reorder buffer array coupled to the instruction cache for queuing the fetched instructions in-order, a plurality of execution units coupled to the instruction cache and coupled to the reorder buffer array for speculatively executing the instructions out-of-order to generate results and flags associated with the results, a reorder buffer controller coupled to the plurality of execution units for retiring executed instruction results in-order, an instruction pointer coupled to the reorder buffer controller for tracking the retiring of executed instruction results, the superscalar processor comprising:

a resynchronization condition detector coupled to the plurality of execution units for detecting a resynchronization condition as an instruction is executed; and a resynchronization controller coupled to the reorder buffer controller responsive to the retiring of the result of an instruction for which a resynchronization condition is detected, the resynchronization controller further including:

a queue controller coupled to the resynchronization controller for flushing the queue of fetched instructions including flushing of executed instruction results and flags associated with the results; and a branch unit coupling the instruction pointer to the fetch program counter for redirecting the in-order sequence of instruction fetching based on the tracking of the retiring of instruction results.

4. A method of operating a processor comprising:

fetching an in-order sequence of instructions in-order;

queuing the fetched instructions in-order;

speculatively executing the instructions out-of-order to generate results and flags associated with the results;

retiring executed instruction results and flags in-order;

tracking the retiring of executed instruction results and flags;

detecting a predefined resynchronization condition during the speculative execution of the instructions; and resynchronizing the processor on retiring of the result and flags of an instruction for which the resynchronization condition is detected, the resynchronization operation including:

emptying the instruction queue; and redirecting the in-order sequence of instruction fetching to a point in the instruction order preceding the instruction for which the resynchronization condition is detected.

5. A method according to claim 4 wherein:

queuing the fetched instructions in-order includes:

queuing the instructions in-order in a reorder buffer having a plurality of reorder buffer entries; and selectively issuing the instructions among a plurality of functional units for executing the instructions, the plurality of functional units having respective reservation stations;

queuing the selected instructions directed to the functional units in the respective reservation stations; and flushing the queue of fetched instructions includes:

clearing the reservation stations of the plurality of functional units; and clearing the reorder buffer entries queued subsequent to the instruction for which the resynchronization condition is detected.

6. A method according to claim 4 wherein:

the instructions include a data rotate instruction or data shift instruction for respectively rotating or shifting data a variable number of bits depending on a result of a preceding instruction in-order;

the instructions include a conditional branch instruction conditional upon a result of the data rotate instruction or data shift instruction; and detecting a resynchronization condition includes detecting a result of the data rotate instruction or data shift instruction setting the variable number of bits for rotating or shifting zero and a conditional branch instruction is conditional upon the result.

7. A method according to claim 4 wherein:

the instructions include a floating point instruction that generates a floating point exception condition signal;

the processor includes an input pin coupled to an external signal that determines whether the floating point exception condition signal is ignored; and detecting a resynchronization condition includes detecting a floating point exception condition and the external signal specifies that the floating point exception condition is ignored.

8. A method according to claim 4 wherein:

the instructions include an instruction executing as a sequence of a plurality of suboperations; and detecting a resynchronization condition includes detecting a condition mooting execution of subsequent suboperations during execution of one of the plurality of suboperations.

9. A method according to claim 4 wherein:

the instructions include a floating point instruction executed by a floating point functional unit as a sequence of suboperations; and detecting a resynchronization condition includes detecting a condition mooting execution of subsequent suboperations during execution of a floating point suboperation.

10. A method according to claim 4 wherein:

the instructions include floating point stack exchange instructions; and detecting a resynchronization condition includes detecting a stack error condition including a stack overflow condition and stack underflow condition during execution of a floating point stack exchange instruction.

11. A method according to claim 4 wherein:

the instructions include a data store-to-memory instruction; and detecting a resynchronization condition includes detecting a store to instruction memory during execution of a data store-to-memory instruction.

12. A processor comprising:

a fetch program counter designating an in-order instruction fetching sequence;

an instruction cache storing instructions in-order designated by the fetch program counter;

a reorder buffer coupled to the instruction cache and queuing the fetched instructions in-order;

a functional unit coupled to the reorder buffer and speculatively executing the queued instructions out-of-order to generate results and result flags, the functional unit including a resynchronization detector detecting resynchronization conditions as an instruction executes;

the reorder buffer including a reorder buffer controller coupled to the reorder buffer and retiring executed instruction results and result flags in-order, the reorder buffer controller including a resynchronization controller flushing the queue of fetched instructions in response to retiring of the result of an instruction for which a resynchronization condition is detected;

an instruction pointer coupled to the reorder buffer controller and tracking the retiring of executed instruction results and result flags; and a branch unit coupling the instruction pointer to the fetch program counter for redirecting the in-order sequence of instruction fetching based on the tracking of retired instruction results.

13. A processor as in claim 12, wherein:

the functional unit is an arithmetic logic unit (ALU) and the instructions executed on the ALU include a data rotate instruction and a data shift instruction which respectively rotate or shift data a variable number of bits, the variable number depending on a result of an instruction of preceding order; and the branch unit executes instructions including a conditional branch instruction which is conditional upon a result of the data rotate instruction or data shift instruction; the branch unit including a circuit for generating a resynchronization condition signal when the first functional unit result setting the variable number of bits for rotating or shifting is zero.

14. A processor as in claim 12, wherein:

the processor includes an input pin coupled to an external signal that determines whether a floating point exception condition is ignored; and the functional unit is a floating point unit and the instructions executed on the floating point unit include a floating point instruction for which a floating point exception condition is detected; the floating point unit including a circuit for generating a resynchronization condition signal when a floating point exception condition is detected and the external signal specifies that the floating point exception condition is ignored.

15. A processor as in claim 12, wherein:

the functional unit executes an instruction which is executed in a sequence of a plurality of suboperations; the functional unit including a circuit for generating a resynchronization condition signal during execution of one of the plurality of suboperations which moots execution of subsequent suboperations.

16. A processor as in claim 12, wherein:

the functional unit is a floating point unit and instructions executed on the floating point unit include a floating point instruction which is executed as a sequence of suboperations, the floating point unit including a circuit for generating a resynchronization condition signal during execution of a floating point suboperation which moots execution of subsequent suboperations.

17. A processor as in claim 12, wherein:

the instructions include a floating point stack exchange instruction; and the processor further includes a circuit for detecting stack error conditions including a stack overflow condition and stack underflow condition during execution of a floating point stack exchange instruction and generating a resynchronization condition signal when a stack error condition is detected.

18. A processor as in claim 12, wherein:

the functional unit is a load/store functional unit;

the instructions include a data store-to-memory instruction which is executed by the load/store functional unit; and the load/store functional unit includes a circuit for detecting a store to instruction memory during execution of a data store-to-memory instruction and generating a resynchronization condition signal when a store to instruction memory is detected.

19. A processor including a fetch program counter designating an in-order sequence of instruction fetching, a reorder buffer array queuing the fetched instructions in-order, a functional unit coupled to the reorder buffer array and speculatively executing the instructions out-of-order to generate results, a reorder buffer controller coupled to the functional unit and retiring executed instruction results in-order, an instruction pointer coupled to the reorder buffer controller and tracking the retiring of executed instruction results, the processor comprising:

a resynchronization condition detector coupled to the functional unit and detecting a resynchronization condition during instruction execution; and a resynchronization controller coupled to the reorder buffer controller responsive to retiring of the result of an instruction for which a resynchronization condition is detected, the resynchronization controller further including:
 a queue controller coupled to the resynchronization controller and flushing the queue of fetched instructions; and a branch unit coupling the instruction pointer to the fetch program counter for redirecting the in-order sequence of instruction fetching based on the tracking of retired instruction results.

* * * * *